US006875304B2

(12) United States Patent
Schanke et al.

(10) Patent No.: US 6,875,304 B2
(45) Date of Patent: Apr. 5, 2005

(54) LABEL APPLICATOR

(75) Inventors: Robert L. Schanke, New Berlin, WI (US); Brent A. Bandholz, West Allis, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 10/418,527

(22) Filed: Apr. 17, 2003

(65) Prior Publication Data

US 2004/0206449 A1 Oct. 21, 2004

(51) Int. Cl.[7] ......................... B32B 31/00; B32B 33/00; B32B 35/00; B65B 13/10

(52) U.S. Cl. ................. 156/277; 156/289; 156/DIG. 6; 156/DIG. 37; 100/27; 100/76

(58) Field of Search ................................ 156/247, 249, 156/277, 289, DIG. 6, DIG. 7, DIG. 37, DIG. 39, DIG. 40; 53/399, 450, 452; 100/2, 5, 8, 16, 27, 76, 210

(56) References Cited

U.S. PATENT DOCUMENTS

| | | | | |
|---|---|---|---|---|
| 3,937,641 A | | 2/1976 | Kushner et al. | |
| 4,314,689 A | | 2/1982 | Wilson | |
| 4,351,684 A | | 9/1982 | Gibbons et al. | |
| 4,358,333 A | | 11/1982 | Holland-Lentz | |
| 4,770,729 A | * | 9/1988 | Spencer et al. | 156/73.1 |
| 5,176,948 A | | 1/1993 | Nguyen et al. | |
| 5,444,466 A | * | 8/1995 | Smyczek et al. | 347/4 |
| 5,542,769 A | | 8/1996 | Schneider et al. | |
| 5,705,024 A | | 1/1998 | Bainbridge et al. | |
| 5,849,143 A | | 12/1998 | Ingalls | |
| 5,879,506 A | | 3/1999 | Mueller | |
| 5,879,507 A | | 3/1999 | Schroeder et al. | |
| 6,253,820 B1 | | 7/2001 | Landan et al. | |
| 6,415,842 B1 | | 7/2002 | Vasilakes et al. | |

FOREIGN PATENT DOCUMENTS

| | | | | |
|---|---|---|---|---|
| DE | 19821253 | | 11/1999 | |
| DE | 19835413 | | 2/2000 | |
| EP | 0 169 079 A1 | | 1/1986 | |
| JP | 2000347572 | | 12/2000 | |
| RU | 2161584 | | 1/2001 | |
| WO | WO 8801247 A | * | 2/1988 | B65C/3/02 |

OTHER PUBLICATIONS

Sales Literature, Model 6015WA. Label–Aire, No date.

Web Page, <www.gettig.com/TapeMachines.html>, Getting Tape and Labeling Systems, 1999.

* cited by examiner

*Primary Examiner*—Chris Fiorilla
*Assistant Examiner*—Sing P Chan
(74) *Attorney, Agent, or Firm*—Quarles & Brady LLP

(57) ABSTRACT

A label applicator that prints and applies a label onto an elongated object, such as a wire. The label applicator includes a base assembly having an upper surface. A printer is fixed to the base assembly for printing indicia on a label to form a printed label. A label wrapper is fixed to the base assembly adjacent to the printer for receiving the printed label and an object. In operation, the printer feeds the printed label into the label wrapper to form slack in the label to remove tension from the label prior to the label wrapper wrapping the label onto the object.

18 Claims, 40 Drawing Sheets

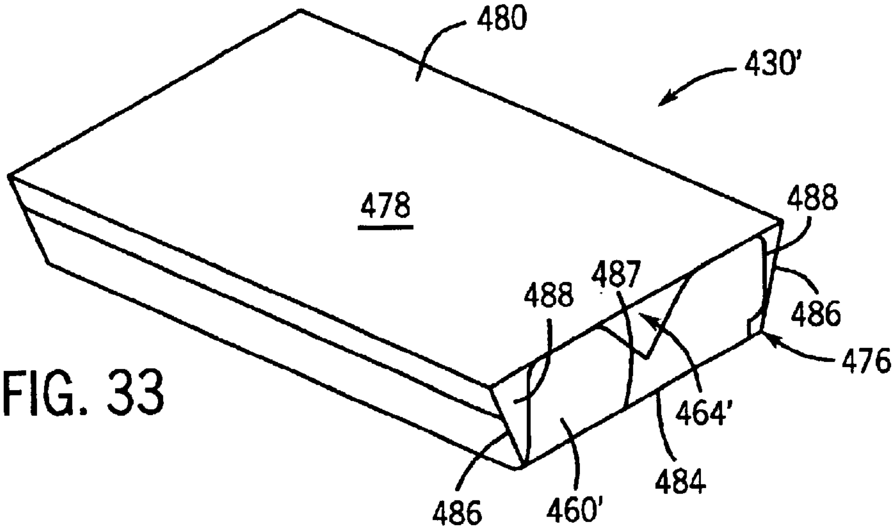
FIG. 33
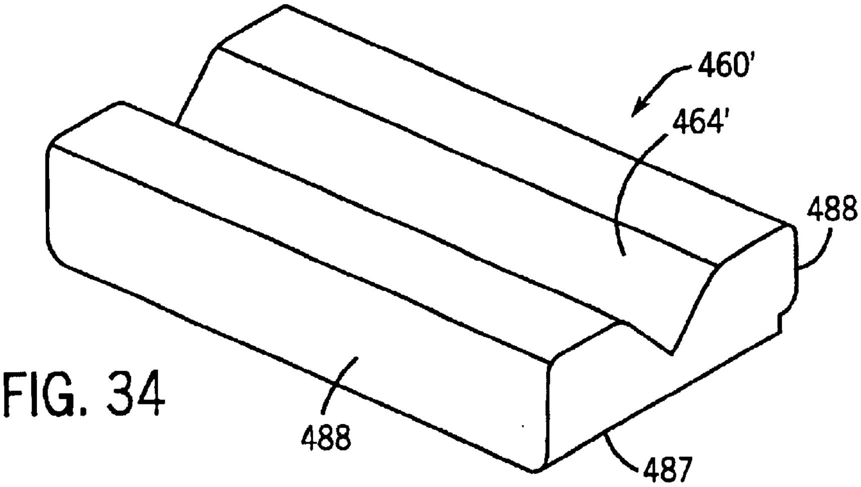
FIG. 34
FIG. 35
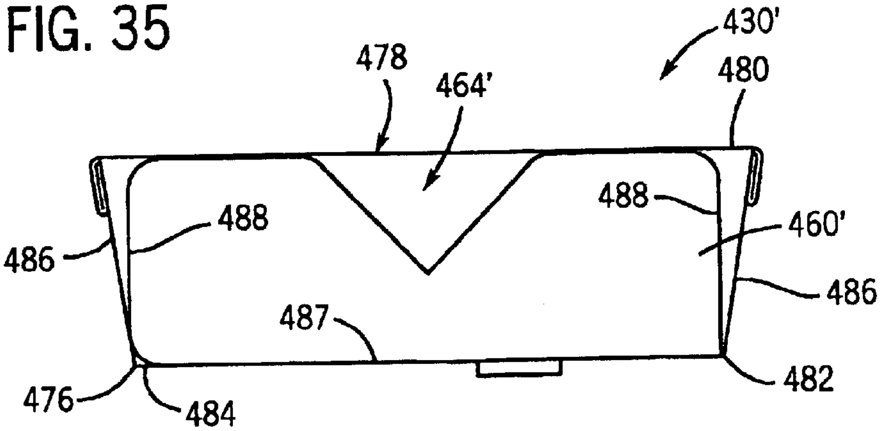

LABEL APPLICATOR

FIELD OF THE INVENTION

The present invention relates to label applicators, and more particularly to a method and apparatus that prints and applies a label to elongated objects, such as wires, bundles of wires, and non-cylindrical objects.

BACKGROUND OF THE INVENTION

Printers, such as thermal transfer label printers, are well known in the art for printing labels. In a typical thermal transfer label printer, a label and a thermal transfer printer ribbon are compressed between a print head and a roller and fed together past the print head. The print head produces sufficient heat in the appropriate locations to transfer the ink from the ribbon to the label to print a label.

The labels produced by the printer are then applied to the wires being labeled by hand. Applying a label to a wire by hand has many drawbacks. Namely, attempting to apply labels to wires, especially small diameter wires, is time consuming, is inaccurate in that it is difficult to place the labels in such a way that the labels are square and aligned on the wire, and is inefficient in that it is difficult to properly and evenly secure the entire label to the surface of the wire.

Label application mechanisms are available that automatically apply tape and preprinted labels to cylindrical objects, such as bottles, cans, and the like. These systems typically require the object being labeled to be conveyed past the applicator mechanism in order for the mechanism to apply a preprinted label. A finishing device can then press the label to the object. However, these systems are designed to be used with large diameter cylindrical objects such as cans or bottles and none of these systems can be used or be easily adapted to be used with elongated, flexible objects of small diameter such as wires, wire bundles, and non-cylindrical objects. In addition, these systems also have other inherent drawbacks and problems.

Application of a label onto a cylindrical object having a relatively small diameter, such as a wire, presents a host of problems. For example, if the label is skewed as it is dispensed toward the wire, or the leading edge of the label is loose from the wire prior to wrapping, the wrapping mechanism can adhere to the adhesive on the label which can jam the wrapping mechanism. The jammed wrapping mechanism must be cleared before wire labeling can continue.

Known mechanisms that apply labels onto wires have problems keeping the initial adhesion of the label to the wire during the wrap cycle. Most labels used for wire application are of a self-laminating type, meaning that the label has a fairly small printable area followed by a clear tail that wraps around the printed portion of the label to help secure the label and to protect the printed area from the elements. Moreover, when the label is separated from the web and transported to the wire being wrapped, the label can become skewed and jam the mechanism.

Second, it is advantageous to label a wire proximal the end of the wire adjacent an electrical connector for easy identification during installation or trouble shooting. Known wire label applicators cannot apply a label proximal an electrical connector because of the diameter difference between the wire and the electrical connector crimped onto the wire end.

The above applicator mechanisms may receive a label from a printer without manual intervention, however, the above mechanisms do not appear to include an integrated wire applicator mechanism that prints and wraps a label onto a wire using a method that avoids many of the problems inherent in the known devices, such as described above. Therefore, it would be advantageous if a wire applicator mechanism could be designed that eliminated the problems of skewed labels, labels being pulled off of wires during wrapping cycles, and inability to wrap a label proximal a wire end. It would also be advantageous if the wire applicator mechanism can print and dispense a label in a way that would eliminate the forces created by the tail of wire labels being removed from the web.

SUMMARY OF THE INVENTION

The present invention provides a label applicator and method of operation that prints a label and then applies the printed label onto an elongated object, such as a wire, wire bundle, and the like, in a manner that eliminates the problem of the labels being pulled off of the wires during the wrap cycle. In particular, in one embodiment, as described below in more detail in the Label Applicator Operation section of the Detailed Description Of The Preferred embodiment, the problem of labels being pulled off of the wire is eliminated by forming slack in the label prior to the label wrapper wrapping the label onto the wire, or other object.

The method provided by the present invention includes a) securing an elongated object in a label wrapper disposed adjacent to a printing mechanism; b) printing indicia onto a label using the printing mechanism; c) feeding the label from the printing mechanism into the label wrapper to a point wherein the label engages the object; d) feeding the label further to form slack in the label to remove tension from the label; and e) wrapping the label onto at least a portion of the object using the label wrapper.

The present invention also provides a label applicator that prints and applies a label onto an elongated object, such as a wire, wire bundle, and the like. The label applicator includes a base assembly having an upper surface. A printer is fixed to the base assembly for printing indicia on a label to form a printed label. A label wrapper is fixed to the base assembly adjacent to the printer for receiving the printed label and an elongated, flexible or rigid, object. In one embodiment, the printer feeds the printed label into the label wrapper to form slack in the label to remove tension from the label prior to the label wrapper wrapping the label onto the object.

A general objective of the present invention is to provide a label applicator that prints and applies a label onto a wire or wire bundle. This objective was accomplished by integrating a printer that dispenses a printed label with a label wrapper that applies the label onto the wire or wire bundle.

Another objective of the present invention is to provide a label applicator apparatus that dispenses a label onto a wire without pulling the label off of the wire upon completion of dispensing the label. This objective is accomplished by forming slack in the label when dispensing the label from the printer into the label wrapper.

The foregoing and other objectives and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 33 is a top perspective view of an alternate V-block assembly of FIG. 25;

FIG. 34 is a top perspective view of the V-block assembly base of FIG. 33;

FIG. 35 is an end view of the V-block assembly of FIG. 33;

DETAILED DESCRIPTION OF THE PREFERRED EMBODIMENT

Figure 1:
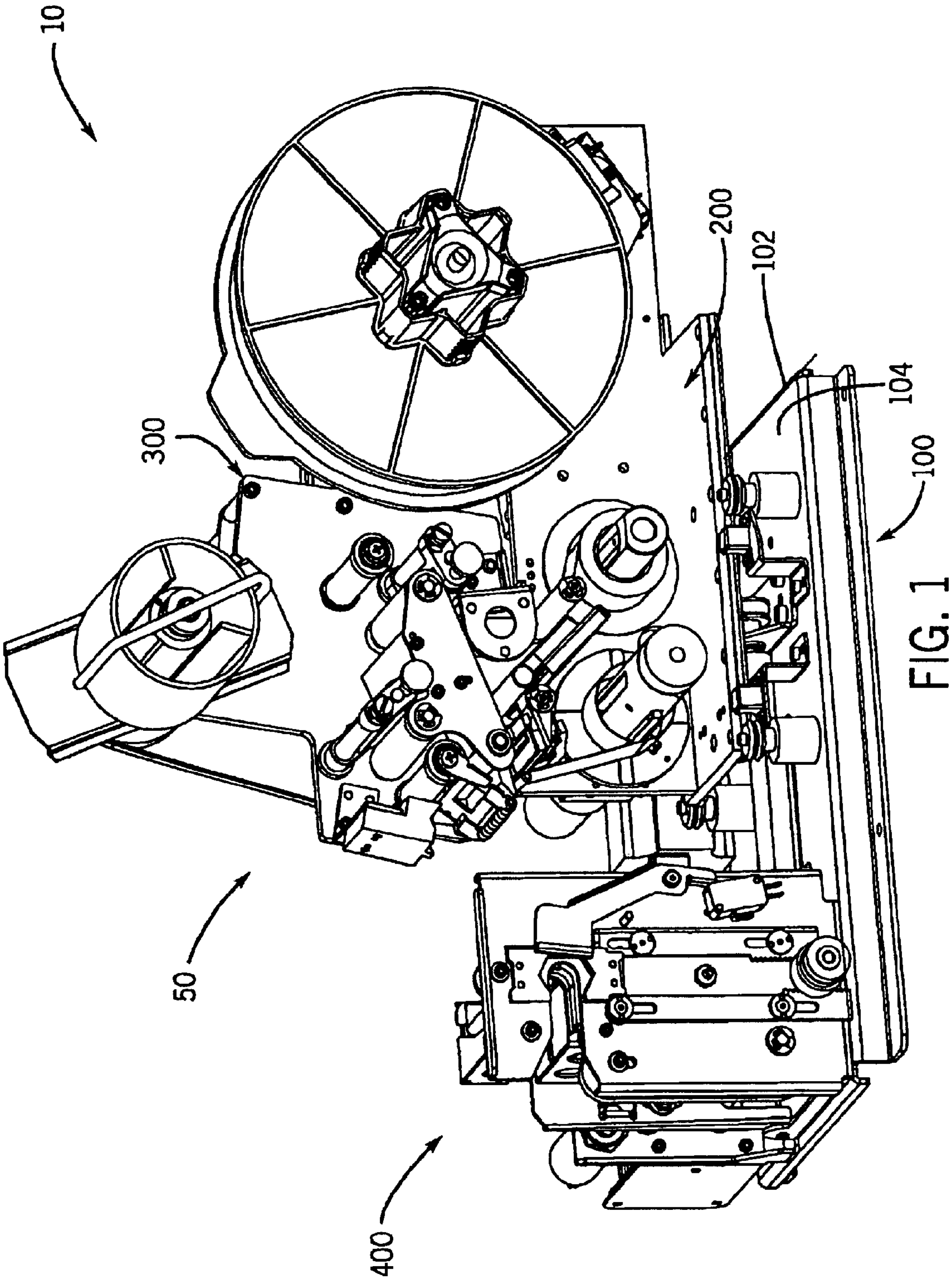
FIG. 1 is a perspective view of a label applicator incorporating the present invention in which the printer is shuttled away from the label wrapper.

As shown in FIGS. 1–4, in one embodiment of the present invention a label applicator 10 includes a thermal transfer printer 50 and a label wrapper 400 mounted on a base assembly 100. A microprocessor electrically connected to both the printer 50 and label wrapper 400 integrates the operation of the printer 50 and label wrapper 400 to print a label and wrap the printed label onto a wire automatically. The microprocessor communicates with and controls the various motors of the apparatus through circuitry (not shown), which is discussed in more detail below.

Base Assembly

The base assembly 100 provides support and stability for the label applicator 10, and slidably mounts the printer 50 relative to the label wrapper 400, which is described in more detail below. As shown in FIGS. 5–8, in one embodiment of the invention the base assembly 100 includes a base 102 having a top wall 104 supported by a pair of longitudinal legs 106. Preferably, the top wall 104 and legs 106 are formed from a single sheet of rigid material, such as steel, aluminum, plastic, and the like. Although a base formed from a single sheet of material is preferred, the base can be assembled from one or more components secured together by any means such as screws, bolts and nuts, welding, adhesives, and the like, without departing from the scope of the invention.

A shuttle plate 150 spaced above the base top wall 104 supports the printer 50, and is horizontally movable relative to the label wrapper 400. The shuttle plate 150 is supported above the base top wall by two pairs of V-wheel subassemblies 108, 116. Each pair of V-wheel subassemblies 108, 116 slidably supports one edge of the shuttle plate 150.

The first pair of fixed V-wheel subassemblies 108 is mounted to the first base top wall 104 adjacent a longitudinal edge 107 of the shuttle plate 150 to support the adjacent longitudinal edge 107 of the shuttle plate 150. Each of the fixed V-wheel subassemblies 108 include a hub 110, which is secured to the base top wall 104, and a fixed pin 112 mounted on the hub 110. A V-wheel 114 is mounted on the fixed pin 112 such that the V-wheel 114 can rotate about the fixed pin 112. The edge of the V-wheel 114 is adapted to receive a track 153 extending from the longitudinal edge 107 of the shuttle plate 150, which will be described in more detail below.

Each of the second pair of V-wheel subassemblies 116 are adjustable and mounted to the top wall 104 adjacent an opposing longitudinal edge 107 of the shuttle plate 150. Each V-wheel assembly 116 of the second pair supports the opposing edge 107 of the shuttle plate 150, and includes a hub 118, which is secured to the top wall 104, and an adjustable pin 120 mounted on the hub 118. A V-wheel 122 is mounted on the adjustable pin 120 such that the V-wheel 122 can rotate about the adjustable pin 120. The edge of the V-wheel 122 is also adapted to receive the track 153 extending from the opposing longitudinal edge 107 of the shuttle plate 150, which will be described in more detail below. Preferably, the adjustable pins 120 are adjustable in the horizontal direction on an eccentric to take out clearance between the V-wheels 114, 122 and tracks 153.

Tracks 153 extending from the shuttle plate longitudinal edges 107 mate with the V-wheels 114, 122 to properly position the shuttle plate 150 above the base top wall 104. The tracks 153 are connected to the shuttle plate 150 such that the tracks 153 protrude transversely away from the longitudinal edges 107 of the shuttle plate 150. The outside edges of the tracks 153 are shaped to fit into recesses in the V-wheels 114, 122, respectively, allowing the shuttle plate 150 to move longitudinally between the V-wheels 114, 122 while supporting the shuttle plate 150 a distance above the base top wall 104. In the embodiment shown herein, the tracks 153 are separate components fixed to the longitudinal edges 107 of the shuttle plate 150 using screws. Although tracks formed from components separate from the shuttle plate are shown, the tracks can be formed as an integral part of the shuttle plate without departing from the scope of the invention.

The shuttle plate 150 is horizontally driven by a lead screw 130 rotatably mounted to the base top wall 104. A tab 124 extending upwardly from the top wall 104 rotatably anchors one end of a lead screw 130 driving the shuttle plate 150. The tab 124 is punched out of the top wall 104, and bent ninety degrees. An aperture (not shown) formed in the tab 124 mounts a bearing (not shown) that receives the lead screw 130. Although a tab 124 formed from part of the base top wall 104 is disclosed, a bracket fixed to the top wall or other structure for anchoring one end of the lead screw can be provided without departing from the scope of the invention.

A transverse base bracket 126 fixed to the base top wall 104 has an upwardly extending leg 125, and extends beneath the shuttle plate 150 to rotatably anchor the opposing end of the lead screw 130. An aperture (not shown) formed in the transverse base bracket upwardly extending leg 125 is axially aligned with the aperture formed in the tab 124, and mounts a bearing 129 that rotatably supports the opposing end of the lead screw 130. The lead screw 130 is secured between the tab 124 and transverse base bracket 126 via a nyloc nut 132 threadably engaging the front end 131 of the lead screw 130 forward of the tab 124.

Rotation of the lead screw 130 longitudinally drives a lead screw drive nut 136 in a linear longitudinal direction, and thus the shuttle plate 150, between forward and rearward positions. The lead screw drive nut 136 threadably engages the lead screw 130 between the tab 124 and transverse base bracket 126, and is fixed to a L-shaped bracket 134 fixed to a bottom surface 140 of the shuttle plate 150. A rotatably driven first pulley 142 (shown in FIG. 8) fixed to the lead screw 130 is rotatably driven by a belt 144 to rotatably drive the lead screw 130.

The belt 144 is driven by the first stepper motor 138 electrically connected to the circuitry. The first stepper motor 138 is mounted to the transverse base bracket 126 adjacent the shuttle plate 150, and has a rotatable shaft 146. A drive pulley 148 fixed to the shaft 146 drives the belt 144 that rotatably drives the first pulley 142. An adjustable idler pulley 154 rotatably mounted to the transverse base bracket 126 engages the belt 144 to urge it beneath the shuttle plate 150 and set the belt 144 tension.

A shuttle home sensor actuator 152 is fixed to the shuttle plate 150, and extends transversely past one longitudinal edge 107 of the shuttle plate 150. The actuator 152 actuates a sensor 155 that sends a signal to the microprocessor through the circuitry to indicate that the shuttle plate 150 is in the forward, or home, position. The sensor 155 is fixed relative to the base 102 by a sensor bracket 156 that can be fixed to the first stepper motor 138, or any other structure fixed relative to the base top wall 104. Although a sensor is used to notify the microprocessor that the shuttle plate is in the home position, other methods known in the art, such as an encoder, can be used to provide a signal to the microprocessor indicating the position of the shuttle plate.

Printer

Figure 2:
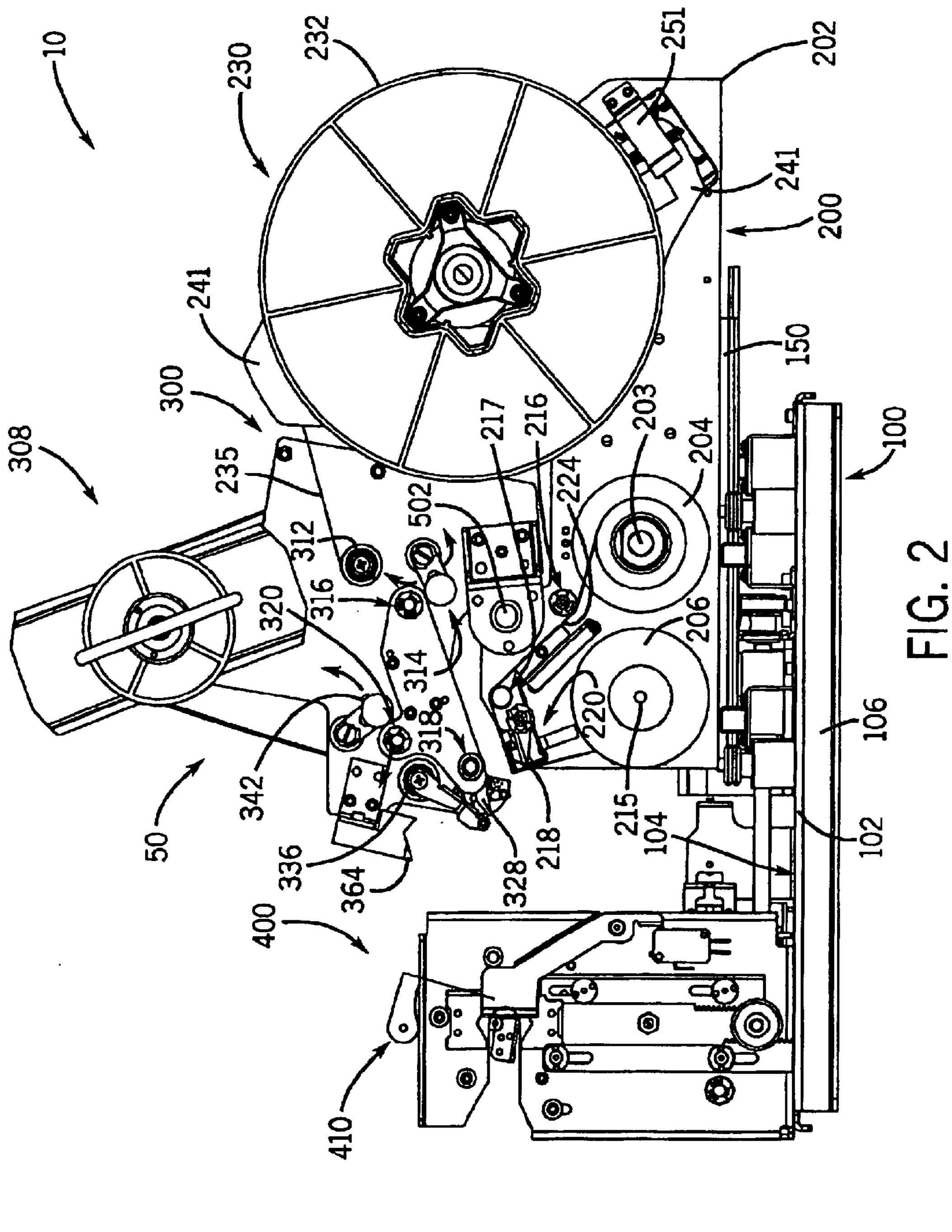
FIG. 2 is a right side view of the apparatus of FIG. 1.

As shown in FIG. 2, the printer 50 prints indicia onto label media 235, and dispenses the printed label into the label wrapper 400. In the embodiment disclosed herein, the printer 50 is a thermal transfer printer having an upper assembly pivotally fixed to a lower assembly. Although a thermal transfer printer is preferred, the printer can be any printer known in the art, such as an ink jet printer, laser printer, impact printer, and the like without departing from the scope of the invention.

Printer Lower Subassembly

As shown in FIGS. 2, 9–18, in one embodiment of the current invention the lower subassembly 200 includes a lower frame 202 that provides the main support for the lower subassembly 200. The lower frame 202 of the lower subassembly 200 is connected to the shuttle plate 150 of the base assembly 100 such that the lower frame 202 is generally perpendicular to the shuttle plate 150. Therefore, as the shuttle plate 150 moves the entire lower subassembly 200 also moves.

The lower subassembly 200 retains and controls the path of the thermal transfer ribbon 224, and is supported above the base 102 by the shuttle plate 150. Referring now to FIGS. 2 and 11–13, the apparatus is shown for use with a roll of thermal transfer ribbon 224. However, it will be understood by those skilled in the art that the current invention could be adapted to use any other source of thermal transfer ribbon or collection method for the thermal transfer ribbon.

The ribbon path begins at a ribbon unwind spool 204 and ends at a ribbon rewind spool 206. The ribbon unwind spool 204 is mounted on a rotatable unwind spool shaft 203 having one end extending through the ribbon unwind spool 204 and the other end extending through a shaft aperture formed in the lower frame 202. The one end of the shaft 203 is rotatably supported by a hub with bearing 209 mounted in the unwind spool shaft aperture, and supports an encoder wheel 207. A slip clutch 205 fixed to the hub with bearing 209 and shaft 203 provides drag to tension the ribbon 224 unwinding from the spool 204.

An encoder wheel 207 is fixed to the one end of the shaft 203 to determine whether the shaft 203 is rotating. Rotation of the encoder wheel 207 is detected by a photoelectric sensor 213 mounted to the lower frame 202 by a bracket 211. The photoelectric sensor 213 is electrically connected to the circuitry, and provides signals to the microprocessor to indicate when the encoder wheel 207 is rotating or whether the ribbon 224 disposed on the ribbon unwind spool 204 has reached its end.

The ribbon rewind spool 206 winds used ribbon 224 thereon at the end of the ribbon path, and is fixed to a shaft 215 extending through an aperture formed through the lower frame 202. The shaft 215 is rotatably supported by a bearing 221 disposed within the aperture in the lower frame 202, and connected to a slip clutch 223 rotatably driven by a DC gear motor 208. The DC gear motor 208 is mounted to the lower frame 202 via a U-bracket 210, and is controlled by the microprocessor electrically connected to the motor 208 by the circuitry. Rotation of the shaft 215 rotatably drives the ribbon rewind spool 206 to pull a ribbon 224 unwinding from the ribbon unwind spool 204 past a print head assembly 220 fixed to the lower frame 202 for printing on a label.

The print head assembly 220 is well known in the art, and includes a spring biased print head 218 that, in cooperation with the thermal transfer ribbon 224, prints indicia onto the label media 235. The print head 218 is mounted on a bracket 222 pivotably mounted on a print head pivot shaft 219. The print head pivot shaft 219 has one end fixed to the lower frame 202, and is cantilevered from the frame 202. First and second ribbon guide posts 216, 217 mounted to the lower frame 202 guide the thermal transfer ribbon 224 from the ribbon unwind spool 204 to print head assembly 220.

The label media 235 is fed from a label unwind spool assembly 230 rotatably mounted to the lower frame 202 that rotatably supports a label spool 232 on a mounting block assembly 240. The label unwind spool assembly 230 includes an unwind spool shaft 238 extending through an unwind spool shaft aperture formed through the lower frame 202. One end of the unwind spool shaft 238 rotatably supports the spring biased mounting block assembly 240 that supports the spool 232. The opposing end of the shaft 238 is supported by a hub with bearing 239 mounted in the unwind spool shaft aperture and fixed to the lower frame 202.

As shown in FIGS. 2, 11–17, the label spool 232, preferably, includes a core 234 that holds a roll of label media 235, such as labels detachably fixed to a web. Inner and outer flanges 236, 237 extend radially from the core 234, and prevent the roll of label media 235 from slipping axially off of the core 234. The inner flange 236 is slidably mounted to the core 234, and retained on the core 234 by a lip 249 extending radially from the inner core end to allow the core 234 to rotate independently of the inner flange 236. Although a label spool 232 having a core 234 and radially extending flanges 236, 237 is preferred, the spool can be provided without flanges, or completely omitted, without departing from the scope of the invention.

A pair of oppositely radially extending tabs 241 extend from the inner flange 236 for mounting a memory cell 243 thereon. The memory cell 243 is mounted on one of the tabs 241 which is received in a clip 251 fixed to the lower frame 202. Information concerning the label media 235, such as label size, number of labels, type of label, and the like, is stored on the memory cell 243. The clip 251 prevents the inner flange 236 from rotating about the unwind spool shaft 238, and protects an electrical contact 247 that electrically engages the memory cell 243. The electrical contact 247 is electrically connected to the microprocessor through the circuitry, and the information stored on the memory cell 243 is read by the microprocessor for use in operating the printer 50.

Referring to FIGS. 2, 9, 11, and 18, the mounting block assembly 240 supports the label spool 232, and includes a body 242. The body 242 is supported between an inner end plate 244 and an outer end plate 245 rotatably mounted to the unwind spool shaft 238. A torsion spring 248 wrapped around the shaft 238 has one end fixed to the shaft 238 and an opposing end 246 engaging the body 242. The torsion spring 248 rotatably biases the body 242 and end plates 244, 245 against unwinding rotation of the body 242 and end plates 244, 245 to rewind the label media 235 onto the label spool 232 when the label media 235 is back fed. Advantageously, the torsion spring 248 also maintains tension in the label media 235 unwinding from the spool 232. A slip clutch 250 fixed to the unwind spool shaft 238 and unwind spool shaft hub with bearing 239 allows rotation of the unwind spool shaft 238 once the tension in the label media 235 exceeds a predetermined limit, and maintains a drag on the rotating shaft 238 to maintain the tension in the label media 235 created by the torsion spring 248.

Printer Upper Subassembly

As shown in FIGS. 2 and 19–22, the upper subassembly 300 is pivotally mounted to the lower subassembly 200, and includes an upper frame 302 that provides the main support for the upper subassembly 300. The upper frame 302 supports a label rewind spool assembly 308, rollers that guide and drive the label media 235 along a path, and a second stepper motor 354 that rotatably drives the drive rollers 316, 320 and the label rewind spool assembly 308.

The label media path begins at the unwind spool assembly 230 and passes a label media guide idler roller 312, a first drive roller 316, and a nip roller 314 before a platen roller 318 urges the label media 235 against the print head assembly 220. The rotatable label media guide idler roller 312 guides the label media 235 along the path downstream of the label unwind spool assembly 230. The label media guide idler roller 312 is rotatably mounted on a fixed idler roller shaft 315 having one end fixed to the upper frame 302.

The first drive roller 316 provides tension to the label media 235, as the label media web moves in the forward direction from the label unwind spool assembly 230 to the label rewind spool assembly 308 (see FIG. 2), and is disposed below and downstream of the label media guide idler roller 312 along the media path. Advantageously, the first drive roller 316 is engagable to drive the label media web in a reverse direction from the label rewind spool assembly 308 to the label unwind spool assembly 230, and disengagable to maintain tension in the label media 235 as the label media 235 moves in a forward direction.

The first drive roller 316 is fixed to a first drive roller shaft 323 having one end extending through a first drive roller aperture formed in the upper frame 302. The one end of the shaft 323 is rotatably supported by a bearing 325 mounted in the first drive roller aperture. A slip clutch 327 fixed to the shaft 323 and bearing 325 maintains the drag on the shaft 323 when the label media 235 is pulled past the first drive roller 316 by a second drive roller 320 in the forward direction.

A pulley 331 fixed to one end of the shaft 323 is engaged to overdrive and slip the label media 235 in a reverse direction. A one way clutch 329 is fixed to the pulley 331 and rotatably engages a second slip clutch 353 fixed to the end of the shaft 323 when the label media 235 is driven in the reverse direction by the second drive roller 320. The pulley 331 is sized to overdrive the label media 235 while the second slip clutch 353 allows a slip between the pulley 331 and the first drive roller 316. Advantageously, when the belt 321 drives the second drive roller 320 in the reverse direction, tension is maintained in the label media 235 due to the overdrive and slip condition between the first drive roller 316 and the pulley 331.

The nip roller 314 urges the label media 235 against the first drive roller 316, and is rotatably supported by a nip roller shaft 337 rotatably mounted to a yoke 333 below the first drive roller 316 and downstream of the label media guide idler roller 312. The yoke 333 is rotatably mounted to the upper frame 302 by a yoke shaft (not shown) having one end fixed to the upper frame 302. The yoke shaft is fixed to the upper frame 302, and rotatably supports the yoke 333 to pivotally mount the nip roller 314 relative to the first drive roller 316. Preferably, a torsion spring 335 wrapped around the yoke shaft biases the yoke 333, and thus the nip roller 314, toward the first drive roller 316 to urge the label media 235 against the first drive roller 316 along the label media path.

The nip roller shaft 337 is axially movable relative to the yoke 333 and upper frame 302, and has one end that is received in an aperture formed in the upper frame 302 to lock the nip roller 314 in a disengage position. Advantageously, the one end of the axially movable nip roller shaft 337 can be slipped into the aperture to hold the nip roller 314 in the disengage position away from the first drive roller 316 when threading the label media 235 along the label media path prior to operation. A cap can be provided on the nip roller shaft distal end to provide a grasping structure for the user to easily move the nip roller to the disengage position.

A platen roller 318 is disposed downstream of the first drive roller 316, and urges the label media 235 against the print head 218 forming part of the print head assembly 220. The platen roller 318 is freely rotatable about a platen shaft 341 supported between a roller plate 324 and the upper frame 302. Pivotal movement of the upper frame 302, as discussed below, pivots the platen roller 318 relative to the print head 218.

A peel plate 328 is mounted to the upper frame 302 forward of the platen roller 318, and defines a dispensing edge 330. The dispensing edge 330 forms a corner for peeling the labels from the web once the printing is complete. Advantageously, the peel plate 328 with the dispensing edge 330 ensures consistent dispensing of the labels with minimal tension on the web to eliminate feed problems caused by excessive web tension.

A web guide idler roller 336 is rotatably mounted on a web guide idler shaft 349, and guides the web from the peel plate 328 after the labels have been removed. The web guide idler shaft 349 has one end fixed to the upper frame 302, downstream of, and above, the peel plate 328.

A label deflector 338 guides a label detaching from the web into the label wrapper 400, and is rotatably supported between a pair of end brackets 339 supported by the web guide idler shaft 349 above the peel plate 328. The label deflector 338 includes non-stick O-rings 340, such as formed from, or coated with, silicone, that are wrapped around a pin 351 mounted between the end brackets 339. The O-rings 340 of the label deflector 338 guide the labels as they detach from the web. Advantageously, the label deflector 338 deflects a label portion peeled off of the web by the peel plate 328 to prevent the label portion from reattaching onto the web, and to ensure that the label is dispensed substantially flat before initial adhesion to a wire.

The second drive roller 320 is disposed between the web guide idler roller 336 and the second nip roller 342 and pulls the web along the path in a forward direction against the tension in the web caused by the first drive roller 316 and slip clutch 250. The second drive roller 320 is fixed to a rotatably mounted shaft 343 having one end 345 extending through a second drive roller aperture formed through the upper frame 302. The shaft 343 is rotatably supported by a bearing 347 mounted in the second drive roller aperture. A pulley 322 is fixed to the one end 345 of the shaft 343, and engages the belt 321 driving the first drive roller 316 to rotatably drive the second drive roller 320.

The first drive roller 316, the platen roller 318, and the second drive roller 320 are all connected to and supported by a roller plate 324 at their outer ends through bearings disposed within apertures in the roller plate 324. The roller plate 324 is connected to the upper frame 302 via an L-shaped support (not shown) that provides support to the roller plate 324.

A second nip roller 342 substantially identical to the first nip roller 314 is rotatably supported by a second nip roller shaft 350 rotatably mounted to a yoke 346 above the second drive roller 320 and downstream of the web guide roller 336. The yoke 346 is rotatably mounted to the upper frame 302 by a yoke shaft 344 having one end fixed to the upper frame 302. The yoke shaft 344 rotatably mounts the yoke 346 to pivotally mount the second nip roller 342 relative to the second drive roller 320. Preferably, a torsion spring 352 wrapped around the yoke shaft 344 biases the yoke 346, and thus the second nip roller 342, toward the second drive roller 320 to urge the label media web against the second drive roller 320 along the label media path.

The label rewind spool assembly 308 is rotatably mounted to the upper frame 302, and supports a web rewind spool, such as a spool having a core and radially extending flanges, that collects the label web after the labels have been removed. The label rewind spool assembly 308 includes a rotatably mounted shaft 361 extending through a label rewind spool shaft aperture formed in the upper frame 302. The shaft 361 is rotatably supported by a hub with a bearing 363 mounted in the label rewind spool shaft aperture formed through the upper frame 302. A back plate 365 fixed to the shaft 361 can be provided to laterally support label media 235 wound onto the mounting block 348.

A spool mounting block 348 is rotatably fixed to a slip clutch (not shown) which is fixed to one end of the shaft 361. Preferably, a pulley 310 is fixed to a first one way clutch (not shown) and is located on the opposing end of shaft 361 on an opposing side of the upper frame 302. The pulley 310 rotatably drives the shaft 361 and therefore the slip clutch when the drive belt 321 drives the second drive roller 320 in a forward direction. The pulley 310 is sized to overdrive the label media 235 (with labels removed) while the slip clutch allows a slip between the pulley 310 and the spool mounting block 348. A second one way clutch (not shown) fixed to the hub with bearing 363 rotatably engages to lock the shaft 361 when the drive belt 321 drives the second drive roller 320 in a reverse direction. The slip clutch fixed to the shaft 361 and the spool mounting block 348 maintains tension in the label media 235 (with labels removed) when fed in the reverse direction (i.e., unwound from the label rewind spool assembly 308).

The second stepper motor 354 is mounted to the upper frame 302 via standoffs 356 and includes a drive pulley 358 fixed to a rotatable shaft. The second stepper motor 354 drives the label rewind spool assembly 308, the first drive roller 316, and the second drive roller 320 via the belt 321

(see FIG. 20) that interconnects the label rewind spool assembly pulley 310, first drive roller pulley 331, and second drive pulley 322. An idler pulley 319 is rotatably mounted to the upper frame 302, and guides the belt 321 into engagement with the drive pulley 358.

Figure 3:
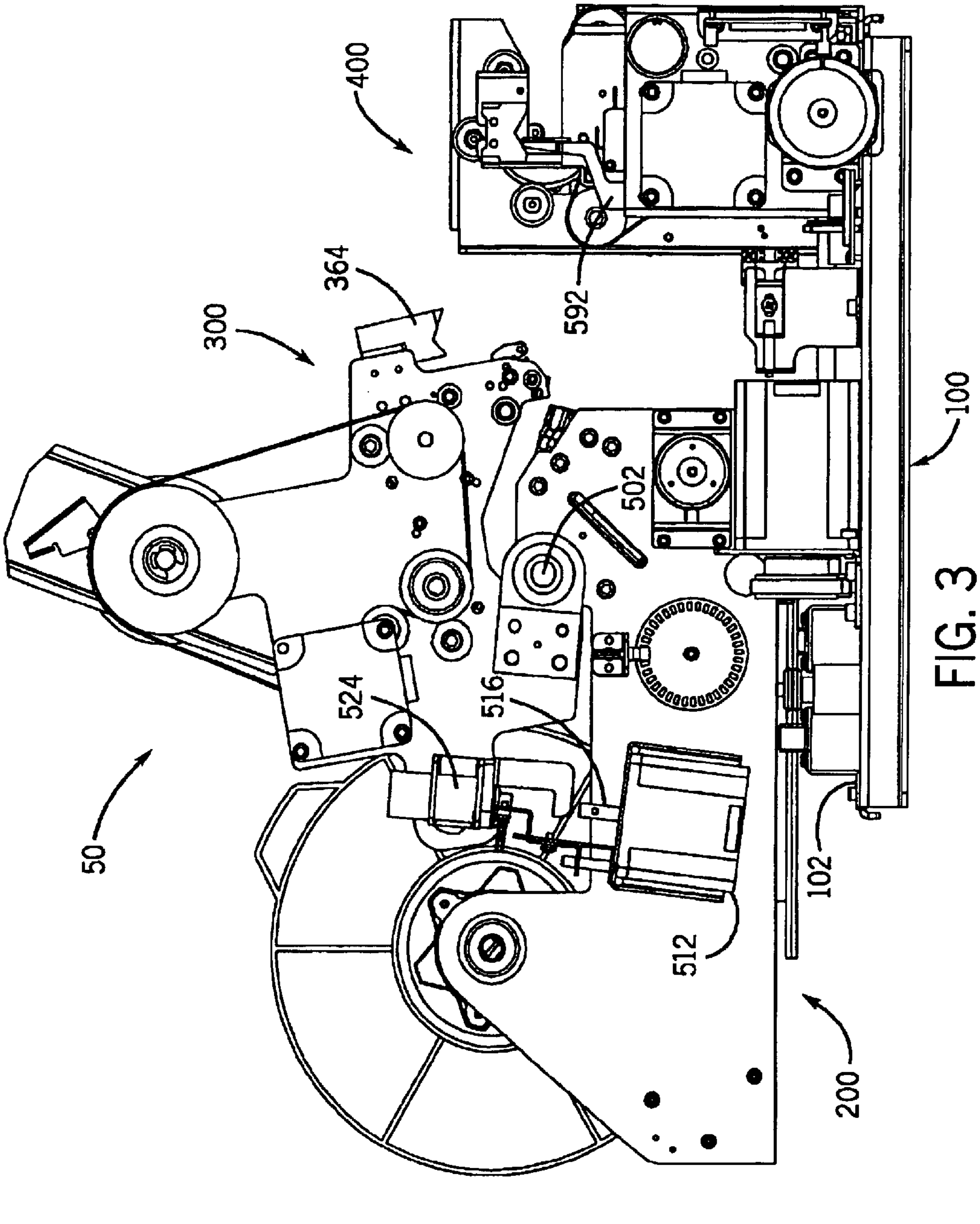
FIG. 3 is a left side view of the apparatus of FIG. 1.
Figure 4:
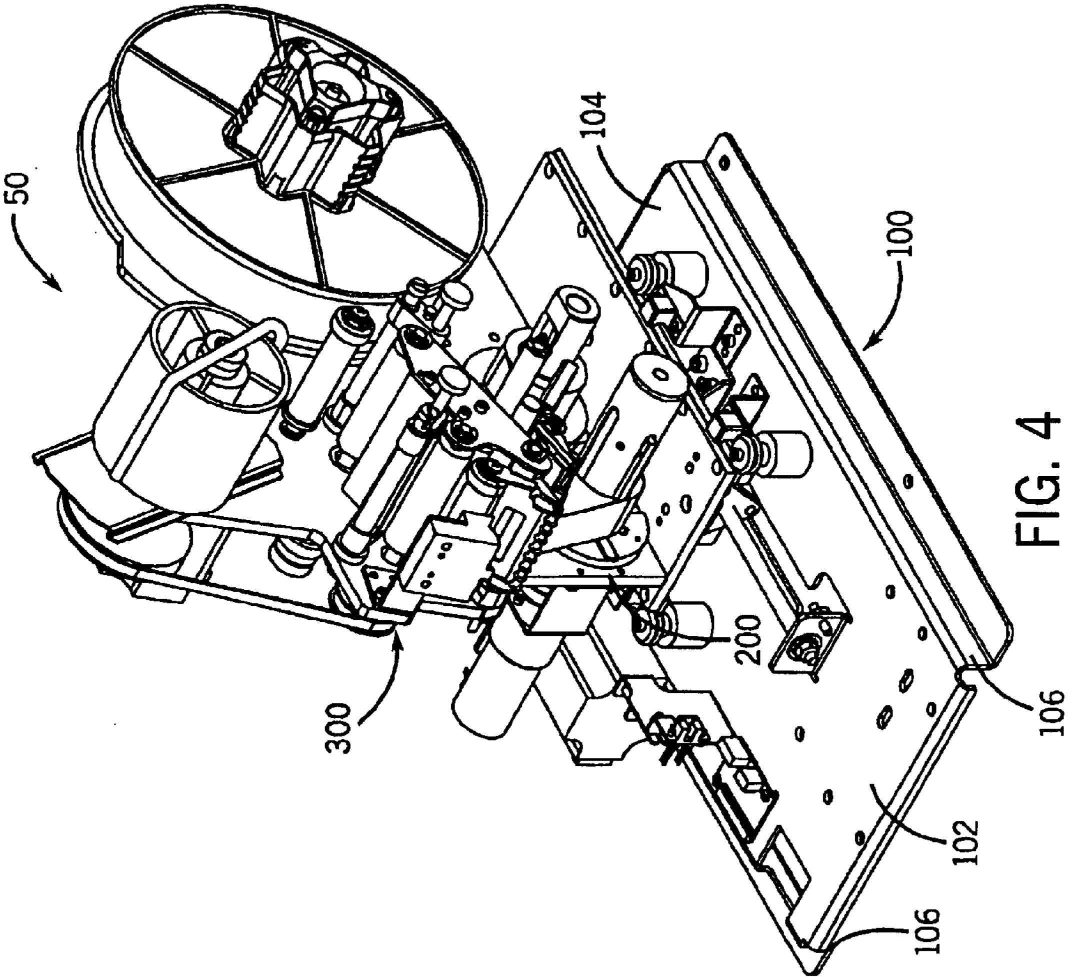
FIG. 4 is a perspective view of the apparatus of FIG. 1 with the label wrapper removed.
Figure 5:
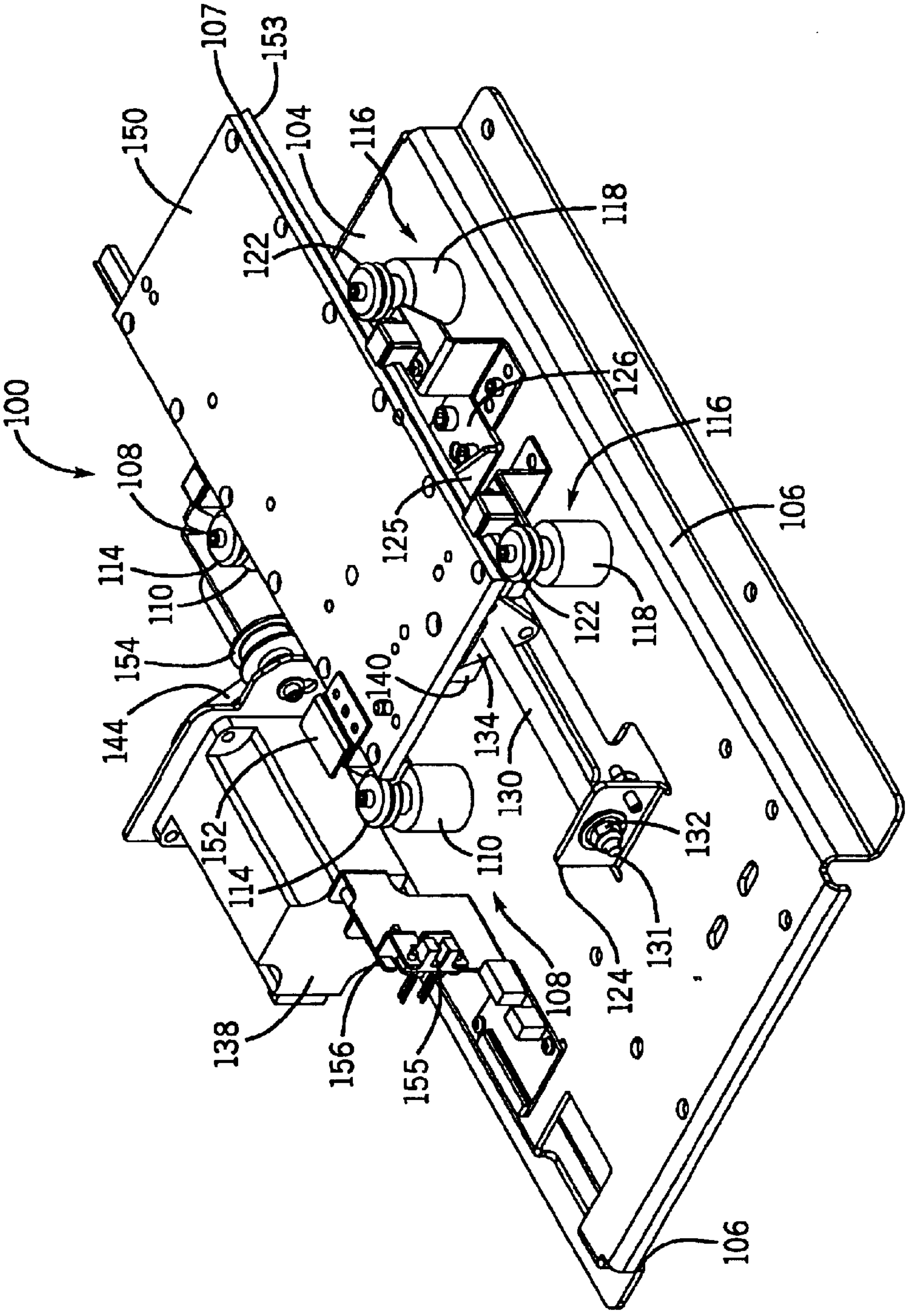
FIG. 5 is a perspective view of the base subassembly of FIG. 1.
Figure 6:
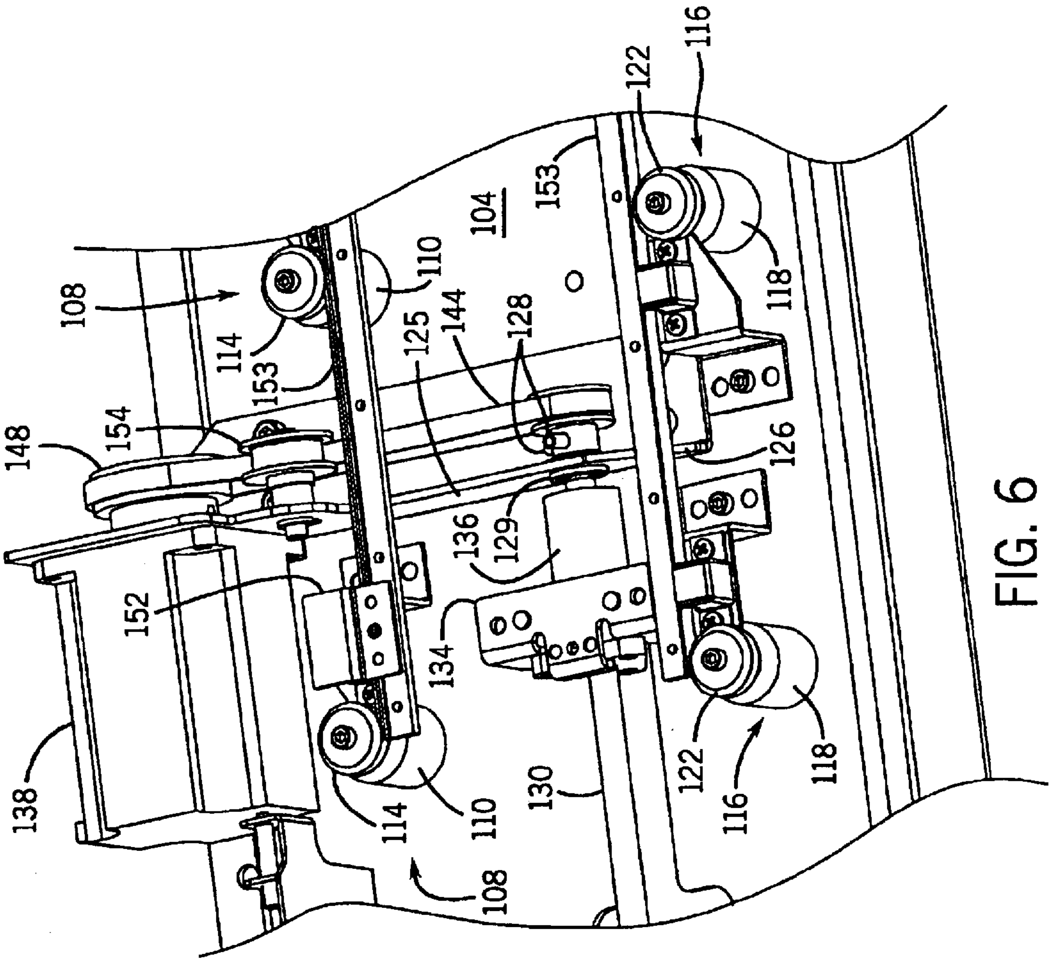
FIG. 6 is a top perspective detailed view of the base subassembly of FIG. 5.
Figure 7:
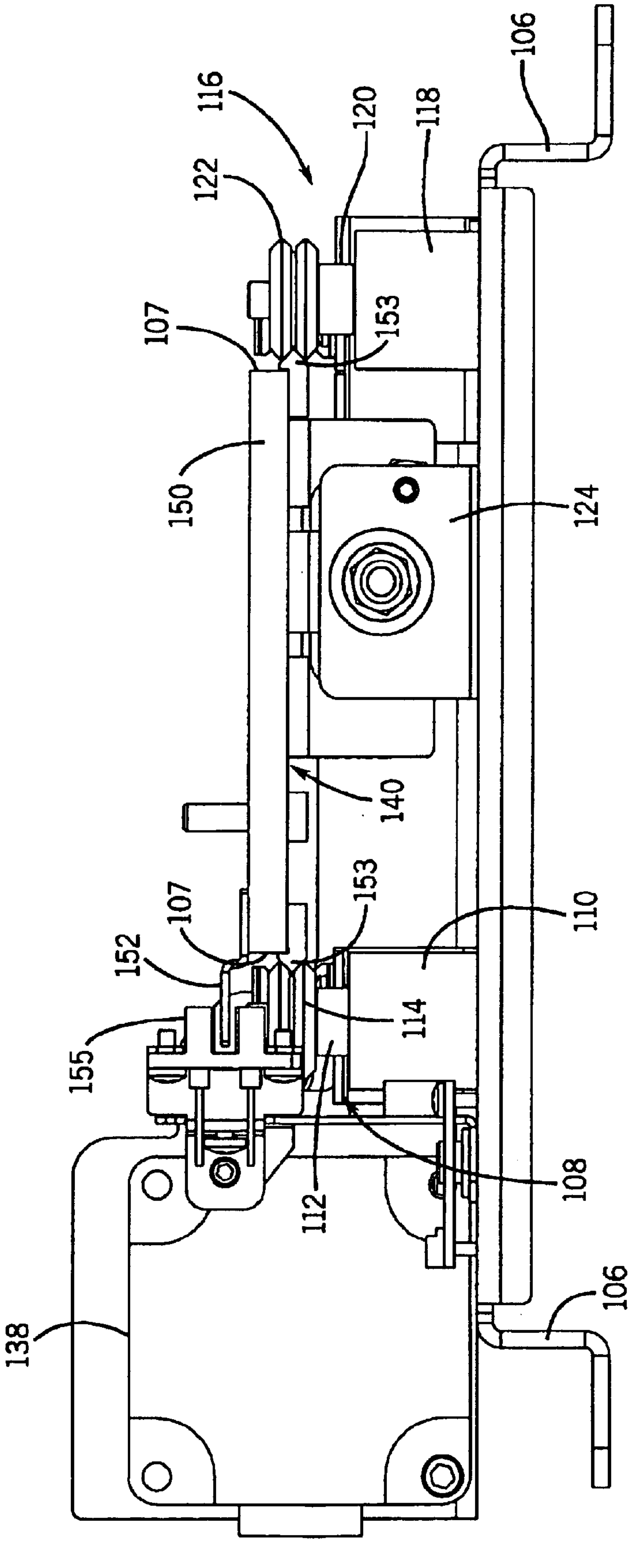
FIG. 7 is a front view of the base subassembly of FIG. 5.
Figure 8:
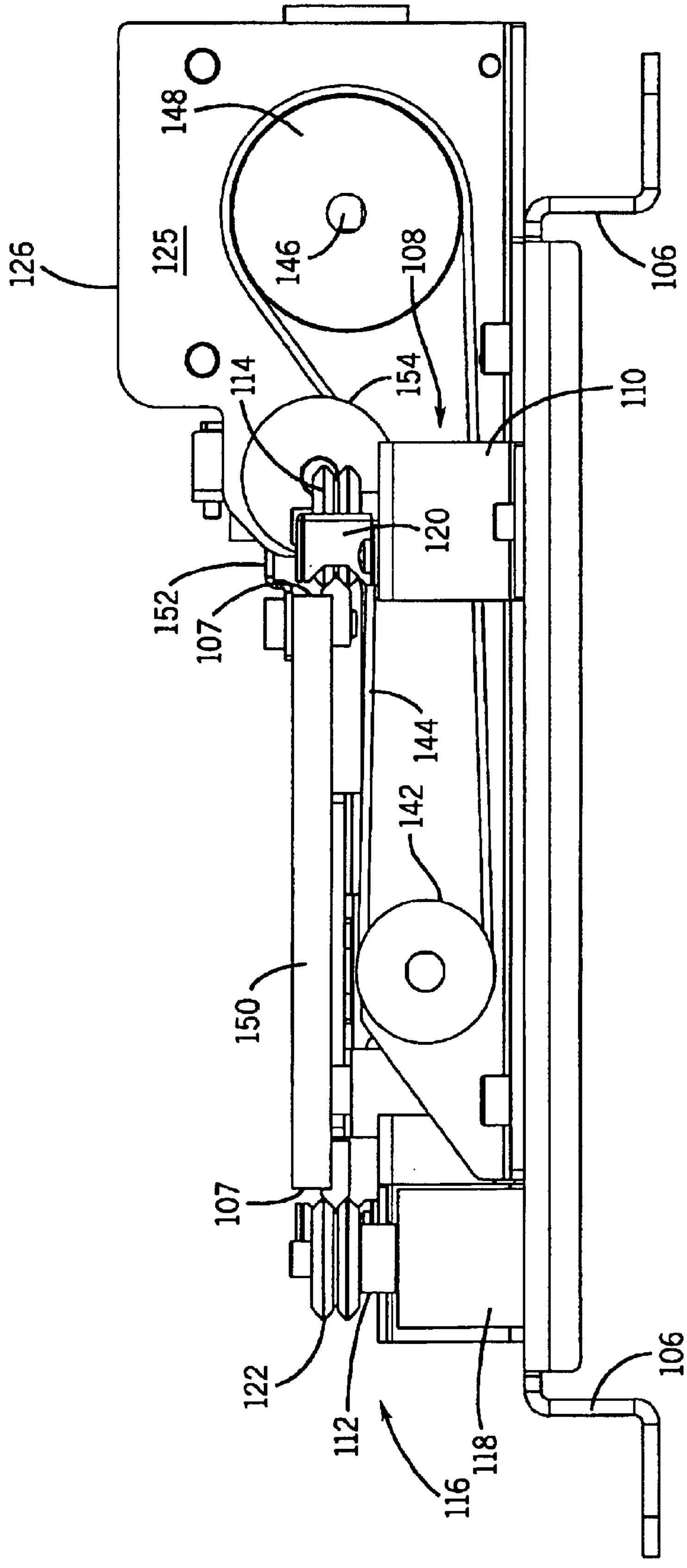
FIG. 8 is a back view of the base subassembly of FIG. 5.
Figure 9:
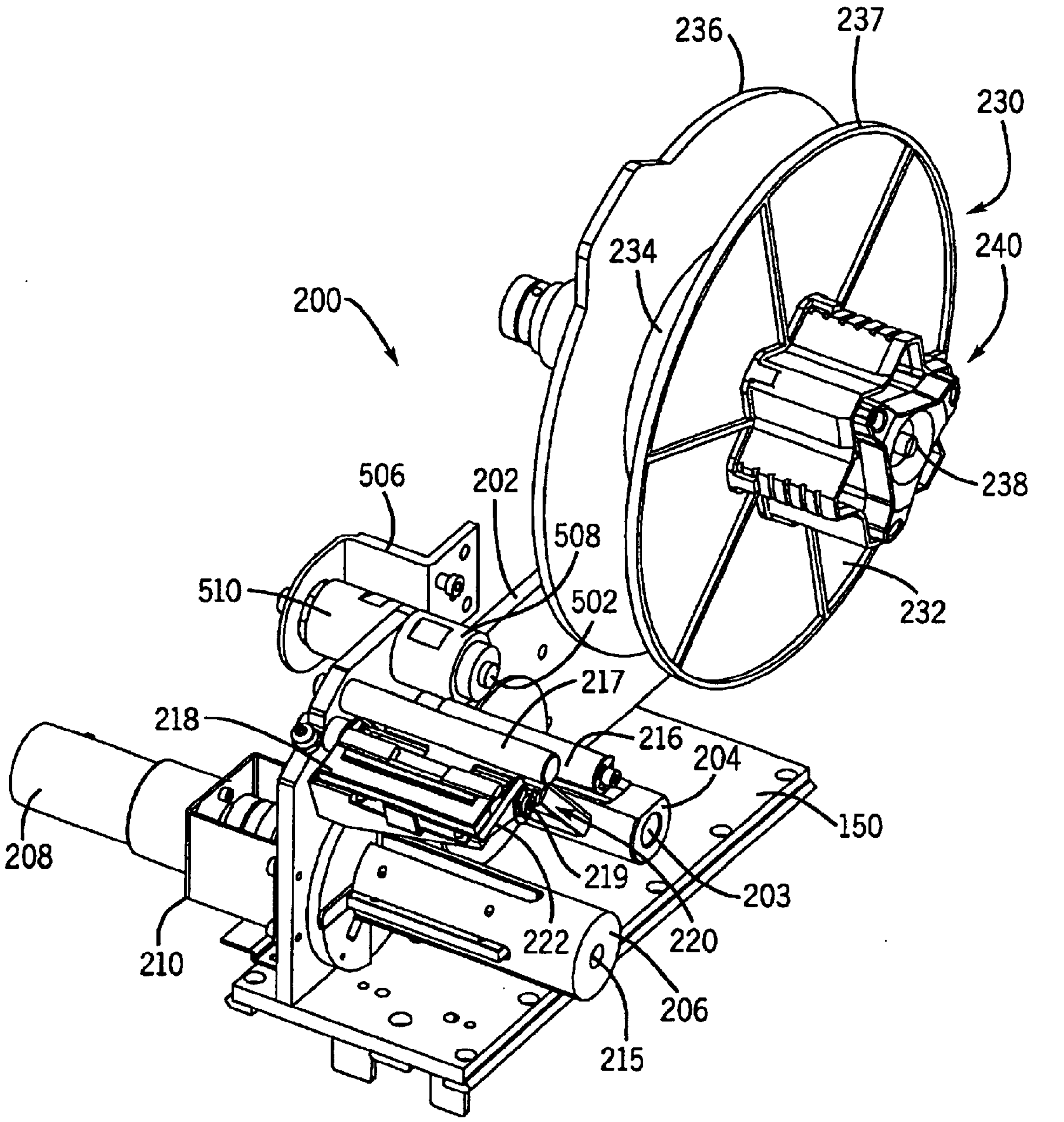
FIG. 9 is a perspective view of the lower subassembly of FIG. 1.
Figure 10:
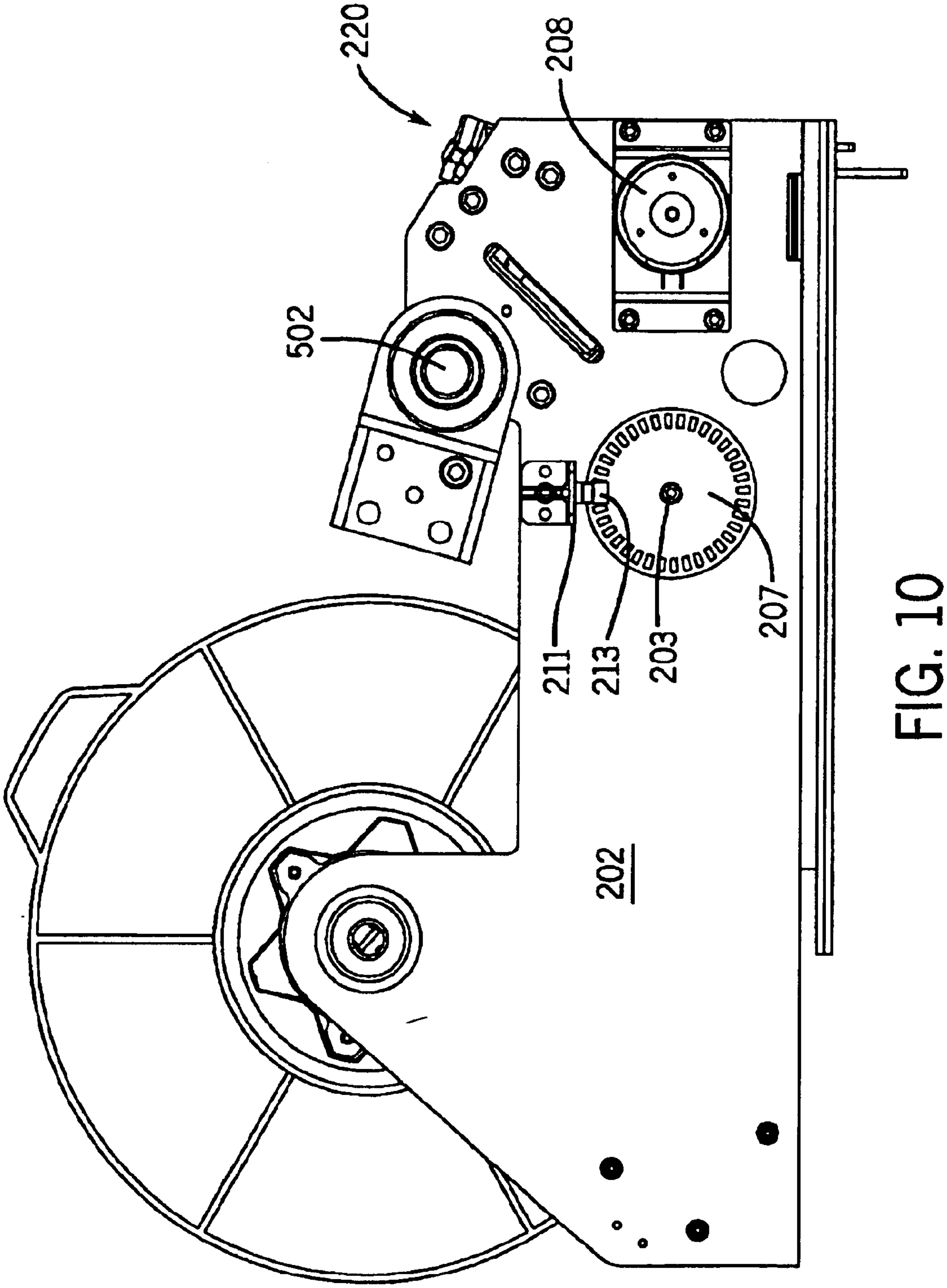
FIG. 10 is a left side view of the lower subassembly of FIG. 9.
Figure 11:
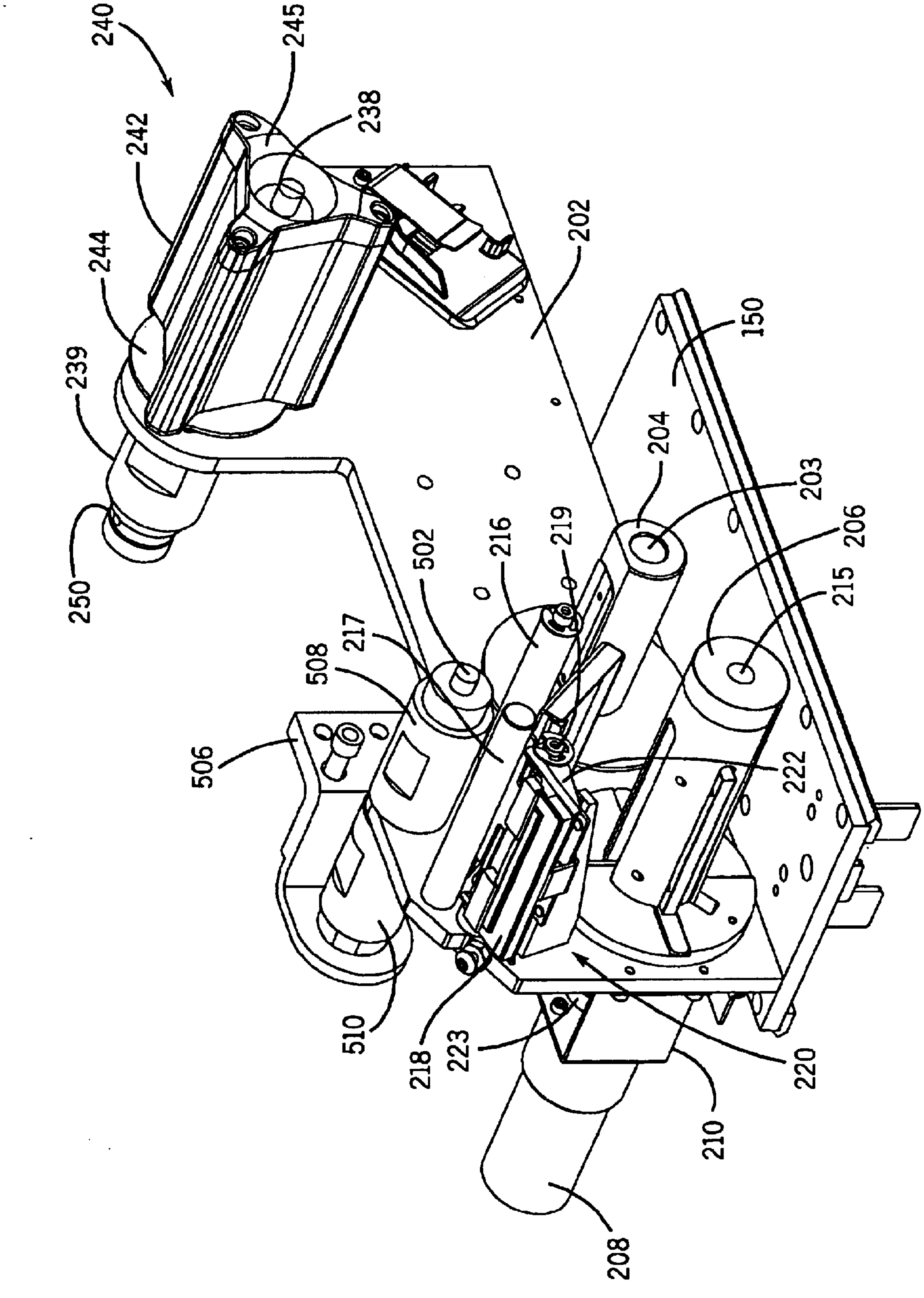
FIG. 11 is a perspective view of the lower subassembly of FIG. 9 with the label unwind spool removed.
Figure 12:
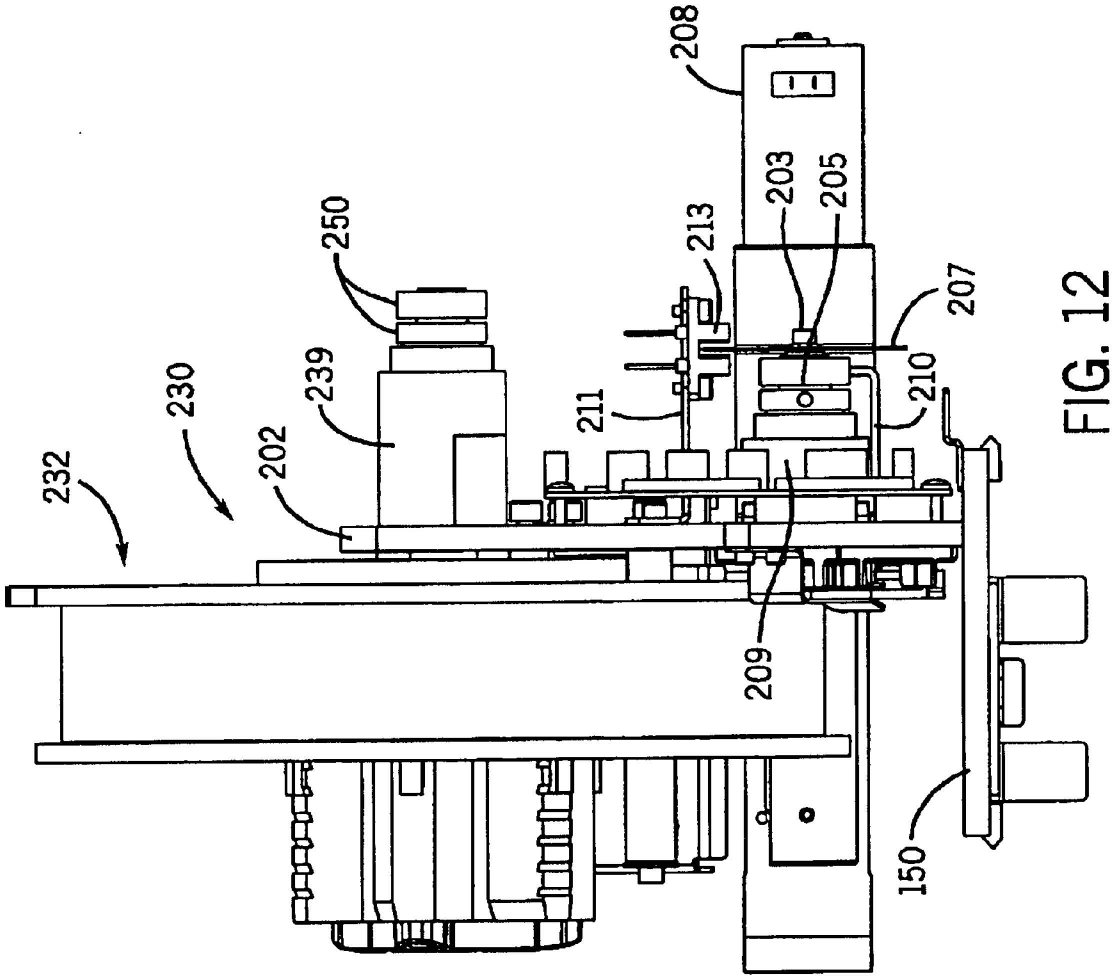
FIG. 12 is a rear view of the lower subassembly of FIG. 9.
Figure 13:
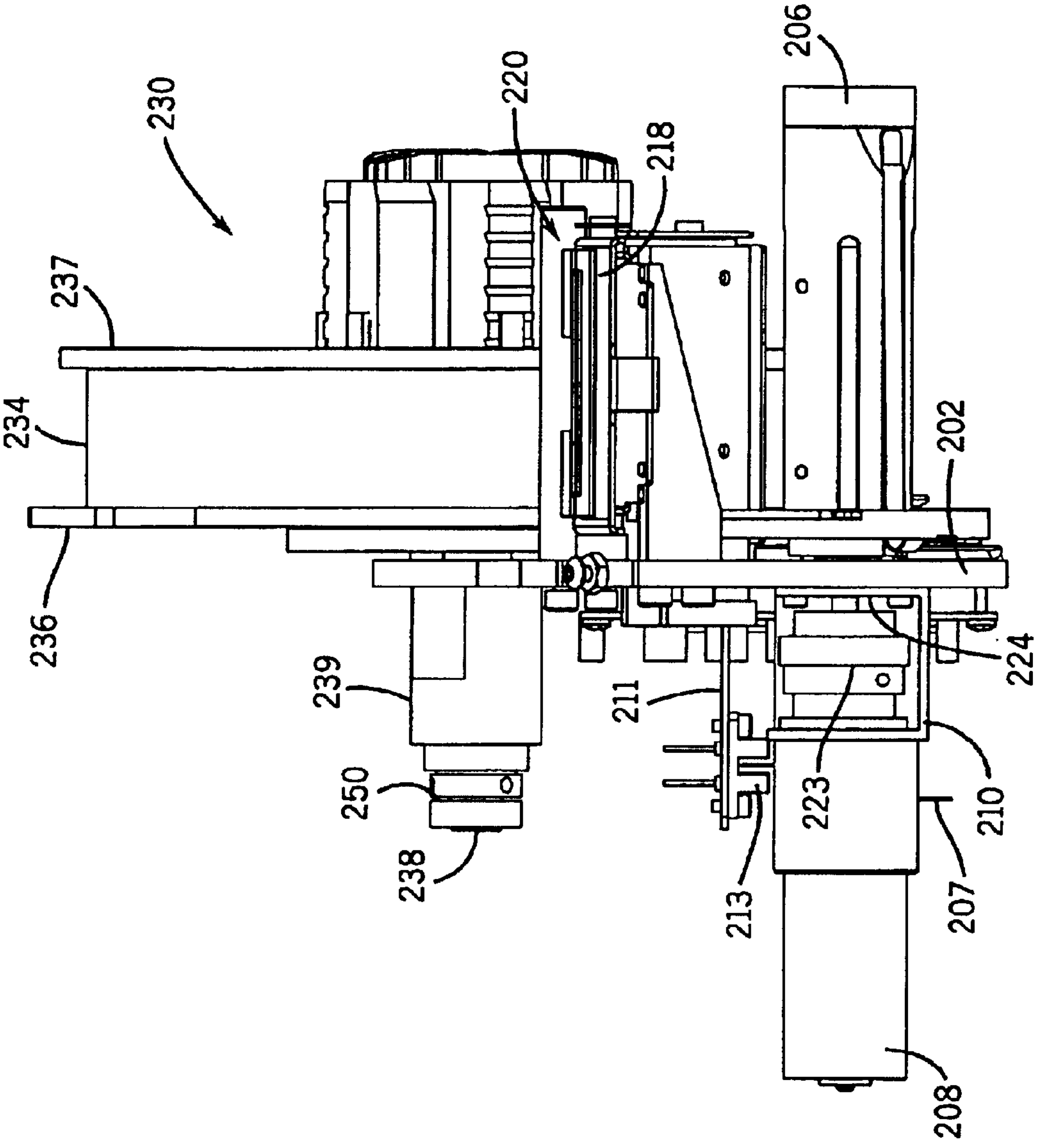
FIG. 13 is a front view of the lower subassembly of FIG. 9.
Figure 14:
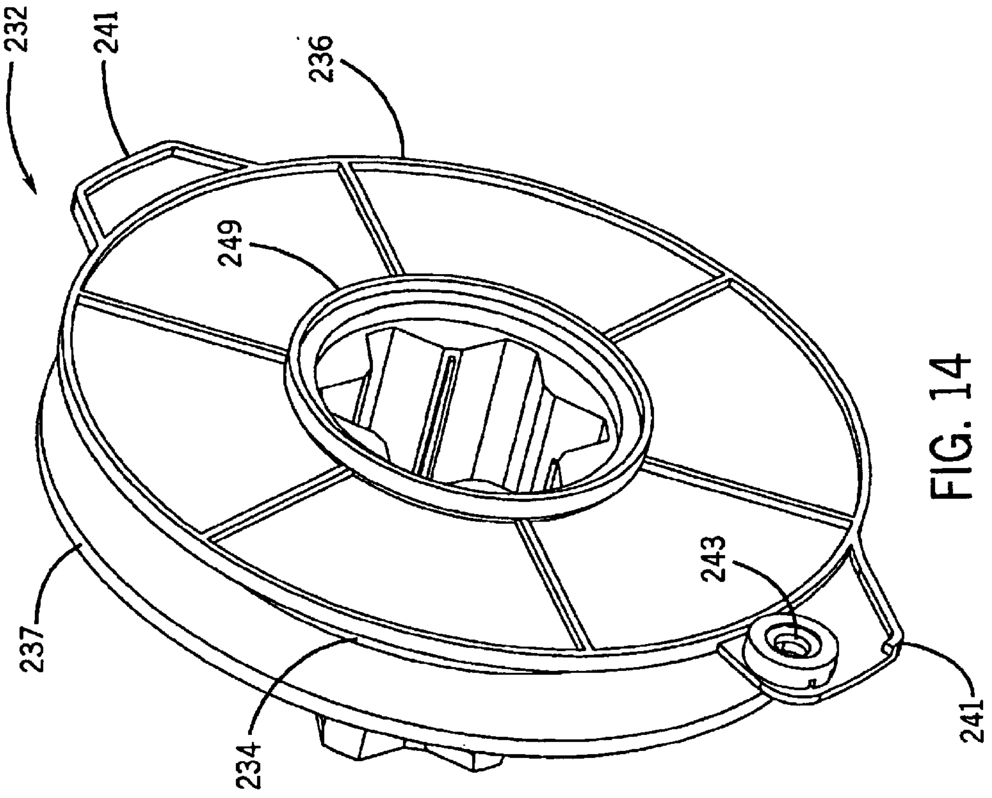
FIG. 14 is a perspective view of the label unwind spool of FIG. 9.
Figure 15:
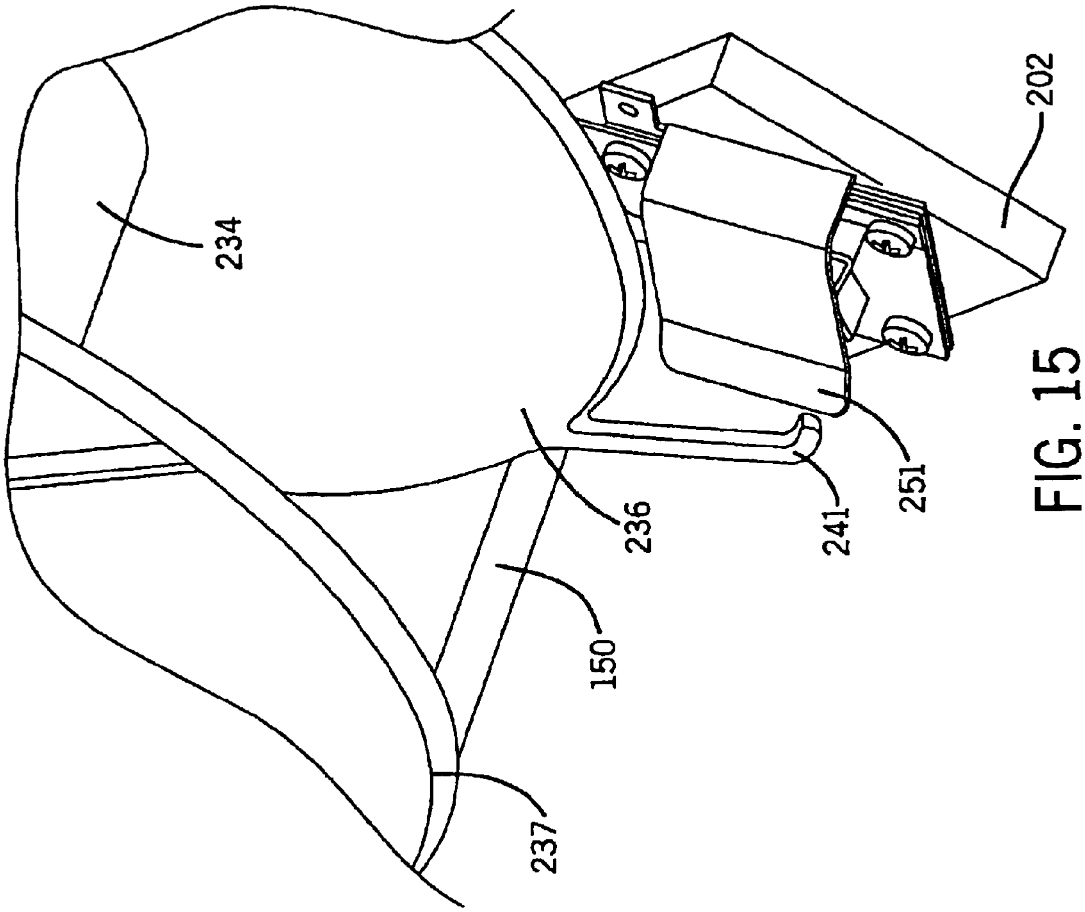
FIG. 15 is a detailed perspective view of the label unwind spool tab and receiving clip of FIG. 2.
Figure 16:
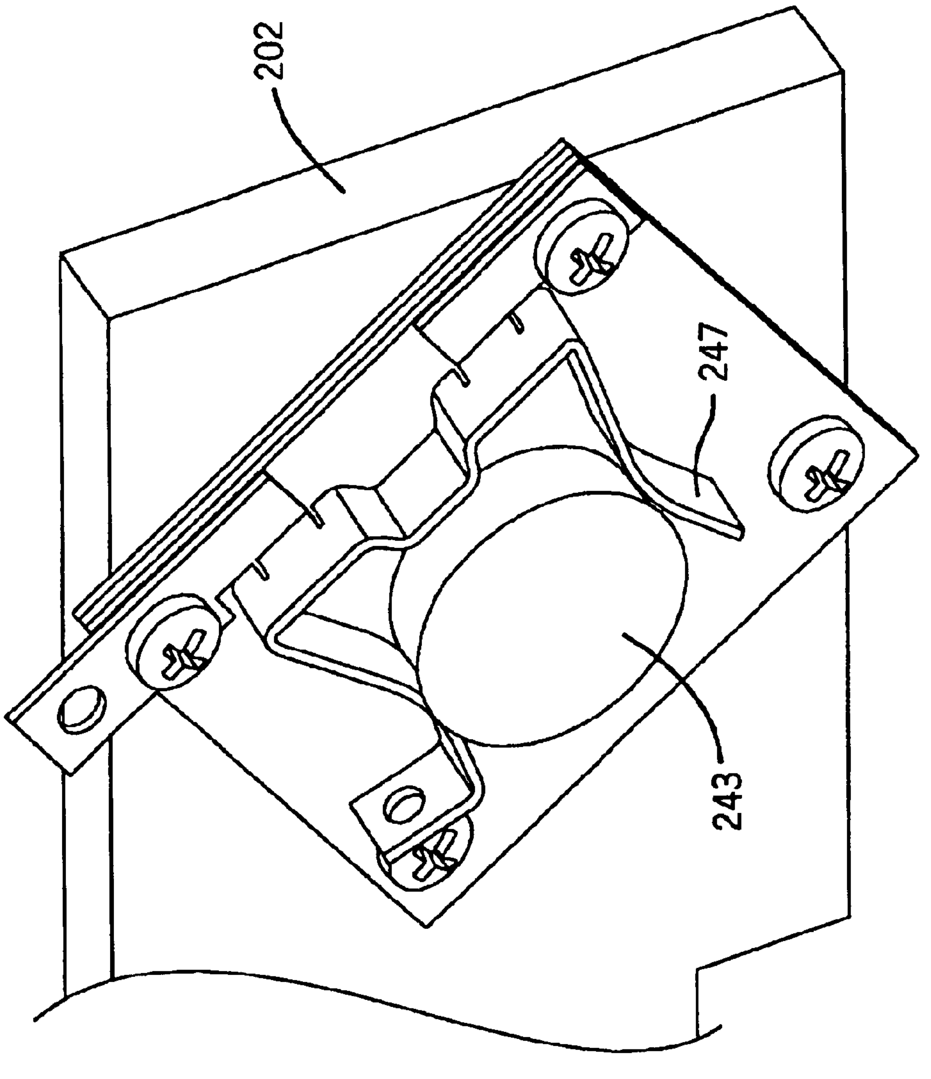
FIG. 16 is a detailed view of the memory cell of FIG. 14 engaging electrical contacts covered by the clip of FIG. 15 with the clip removed.
Figure 17:
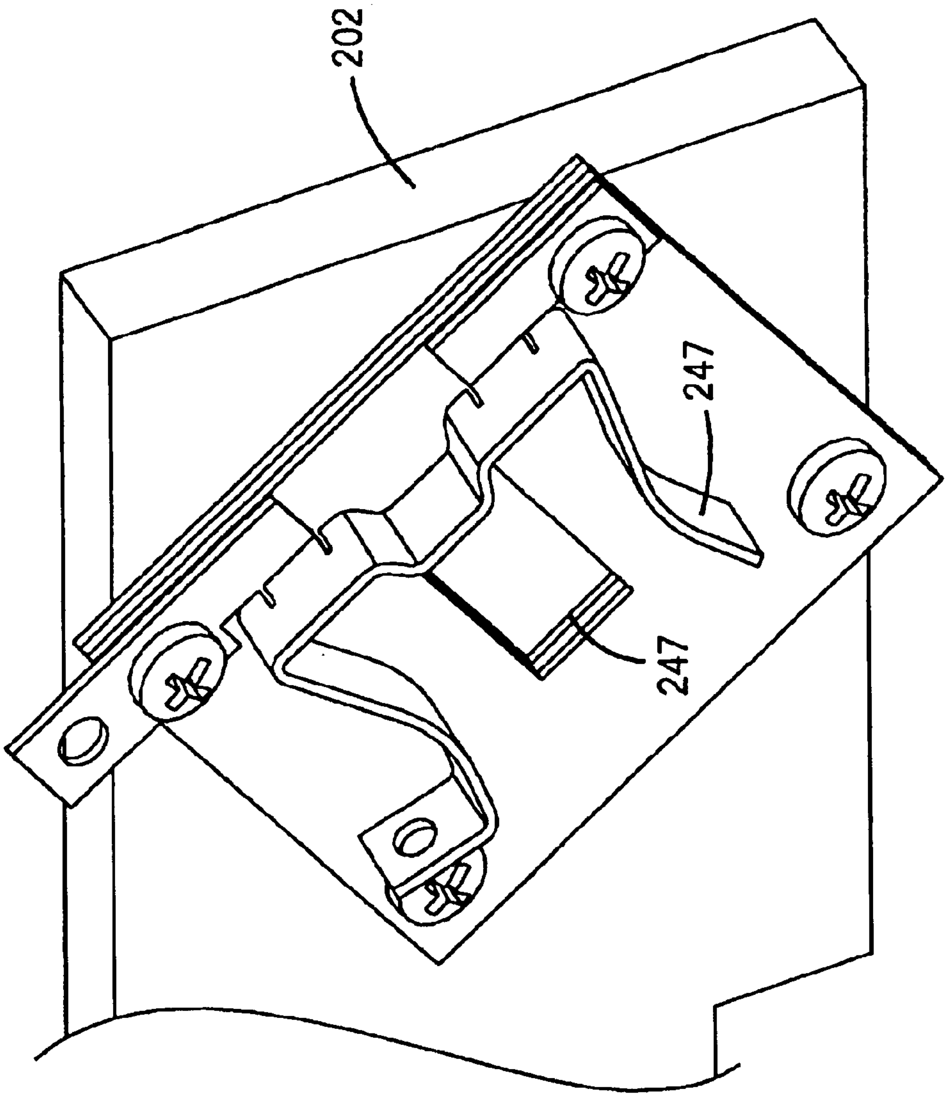
FIG. 17 is a detailed perspective view of FIG. 16 with the memory cell removed.
Figure 18:
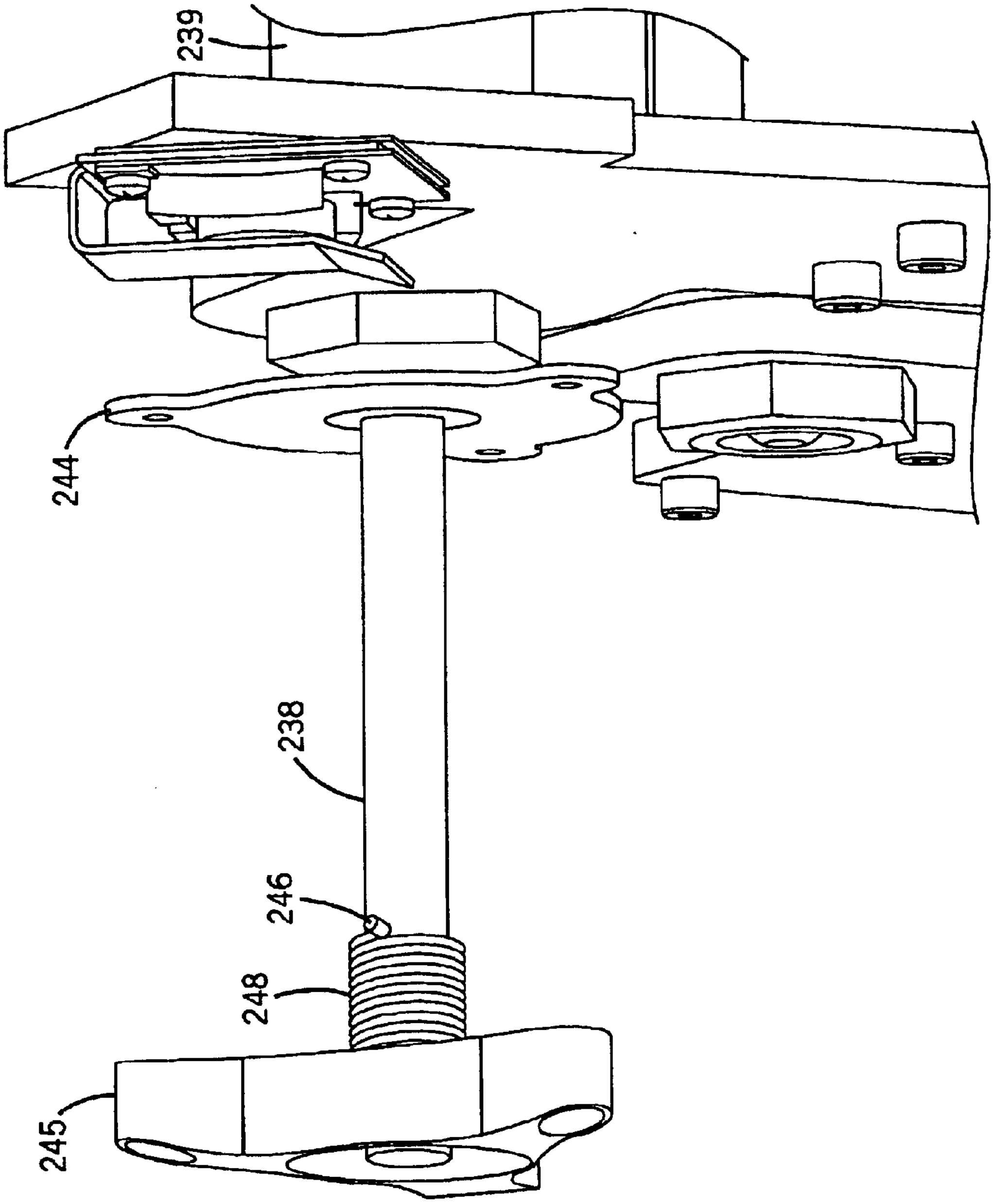
FIG. 18 is a detailed perspective view of the label unwind assembly of FIG. 9 with the mounting block removed.
Figure 19:
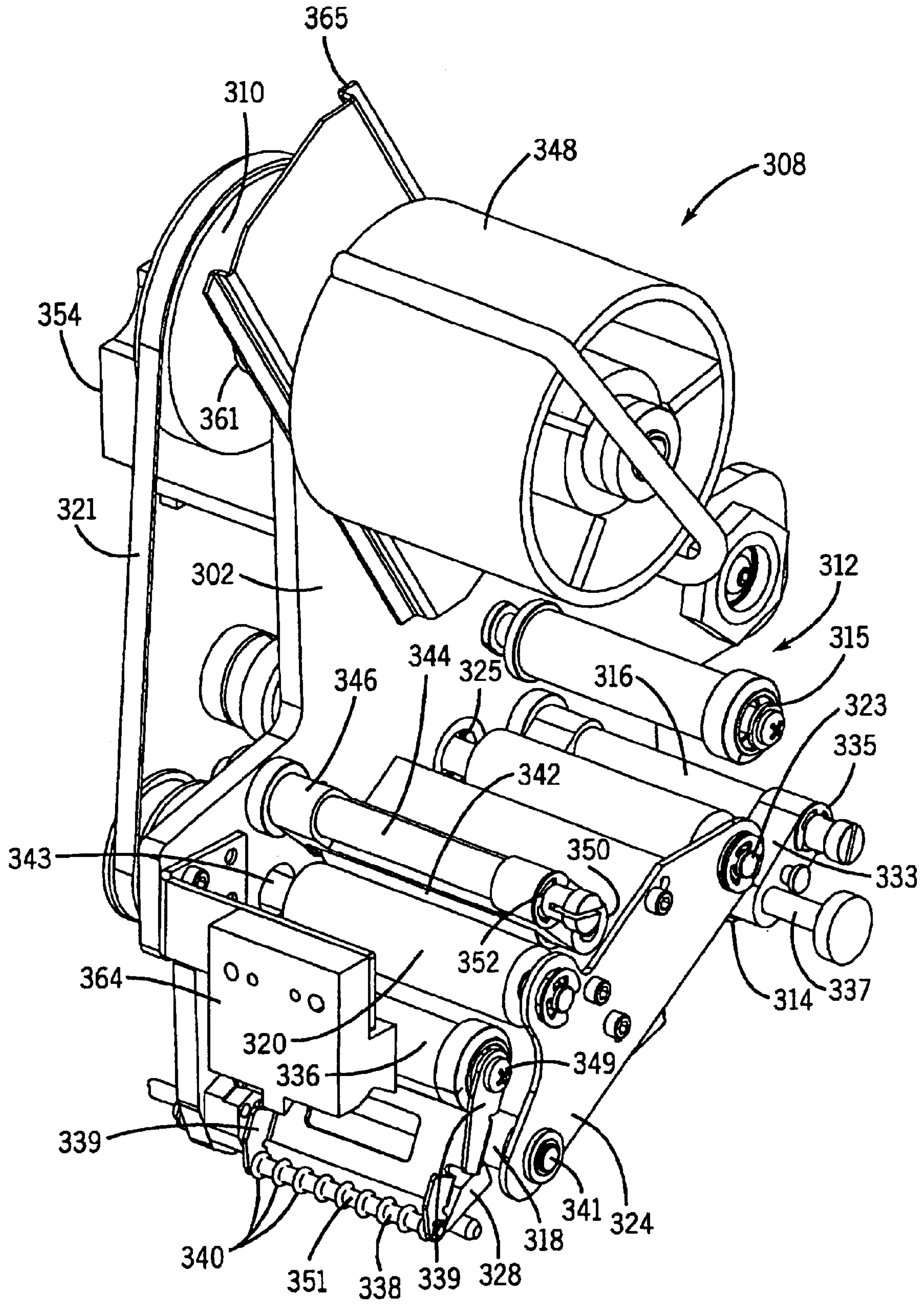
FIG. 19 is a perspective view of the upper subassembly of FIG. 1.
Figure 20:
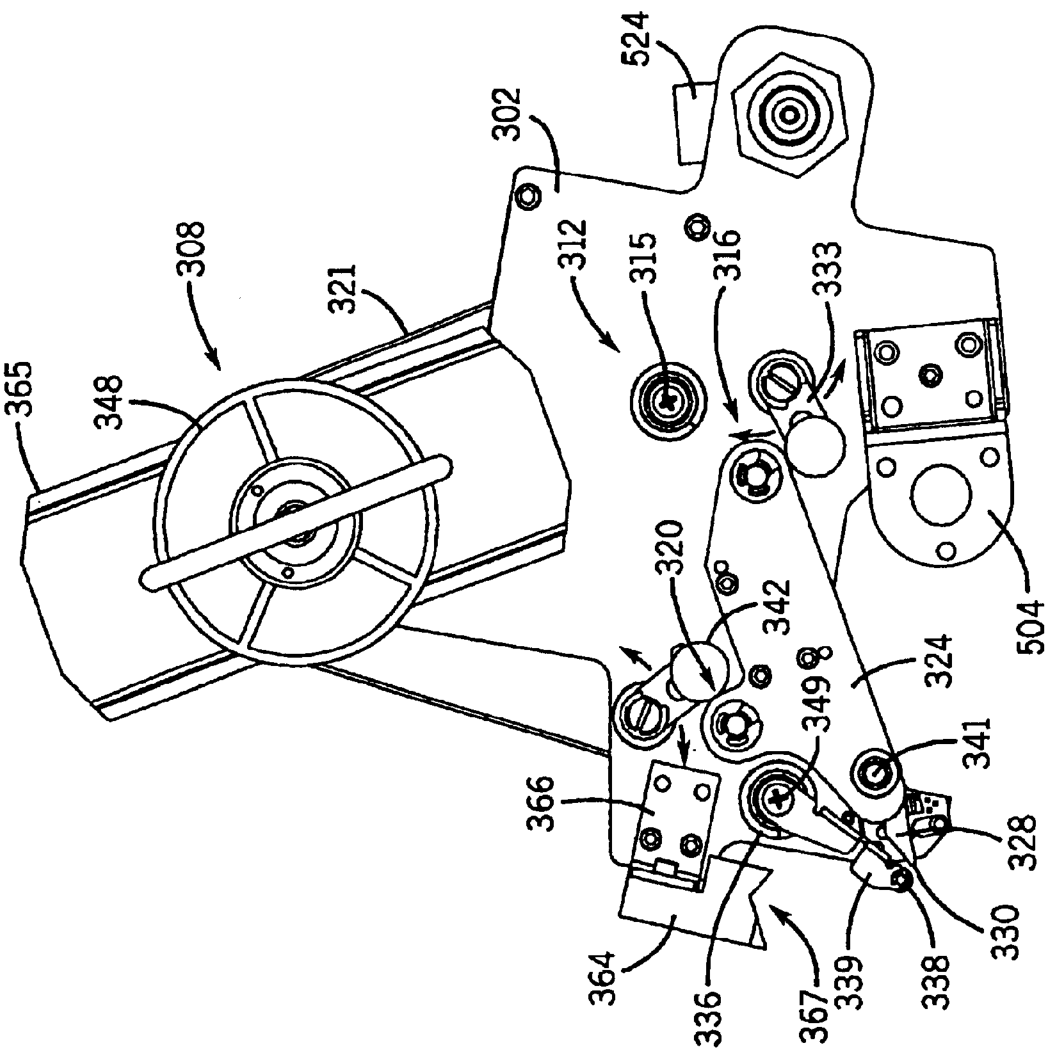
FIG. 20 is a right side view of the upper subassembly of FIG. 19.
Figure 21:
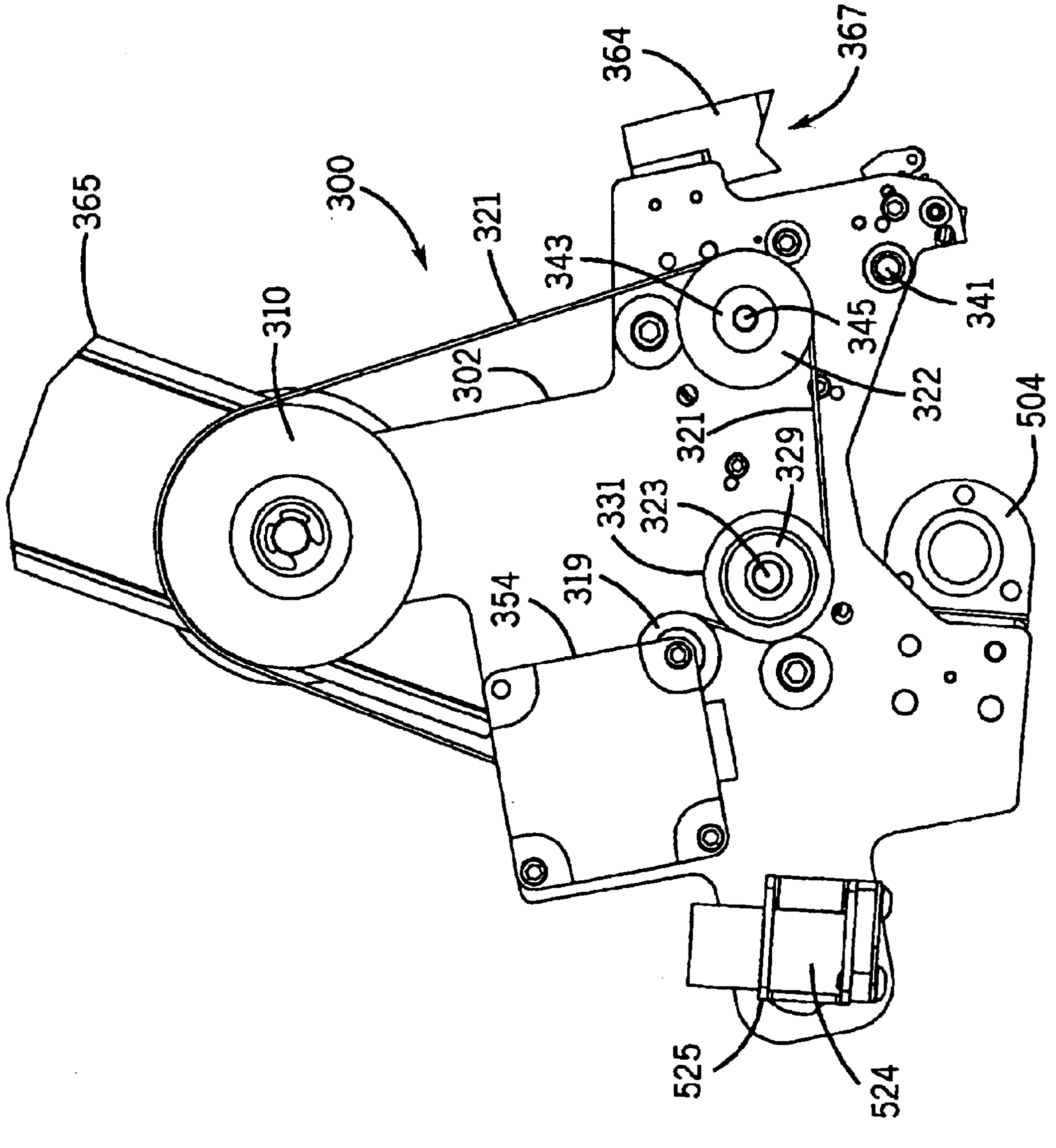
FIG. 21 is a left side view of the upper subassembly of FIG. 19.
Figure 22:
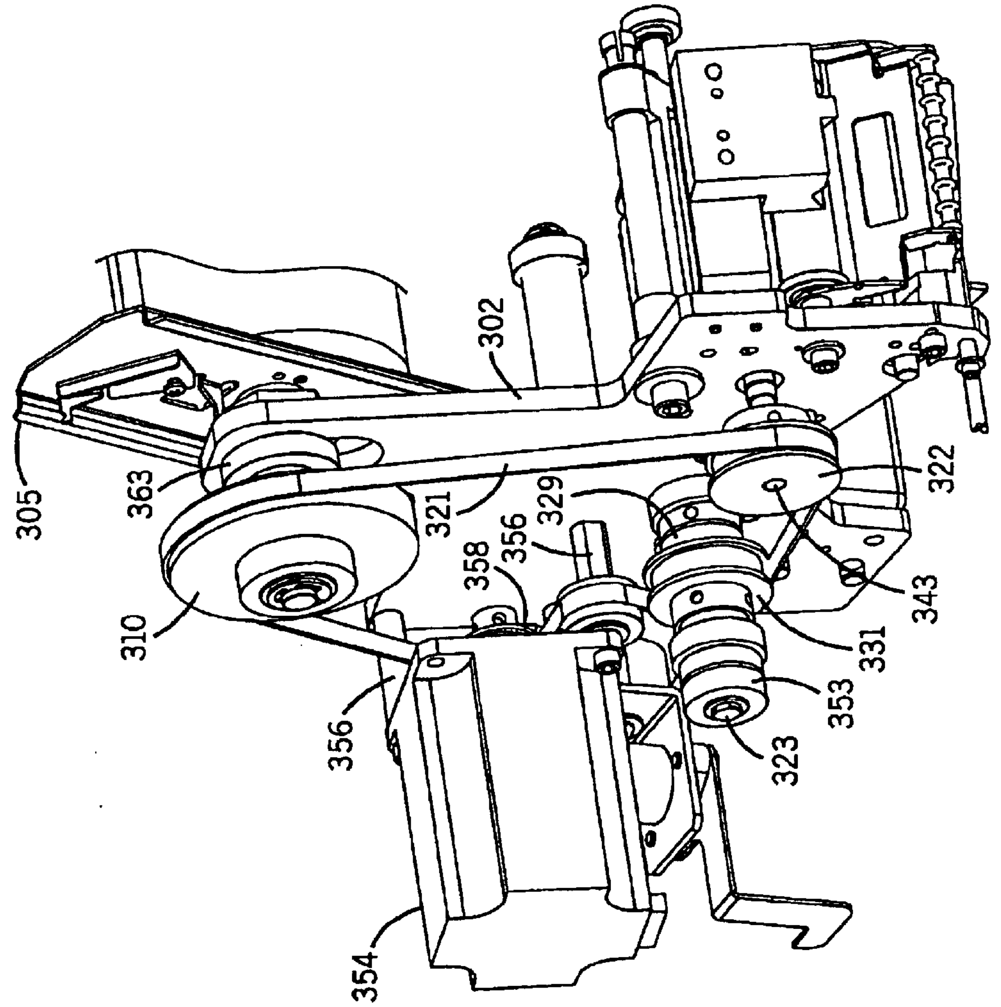
FIG. 22 is a detailed, left perspective view of the upper subassembly of FIG. 19.
Figure 23:
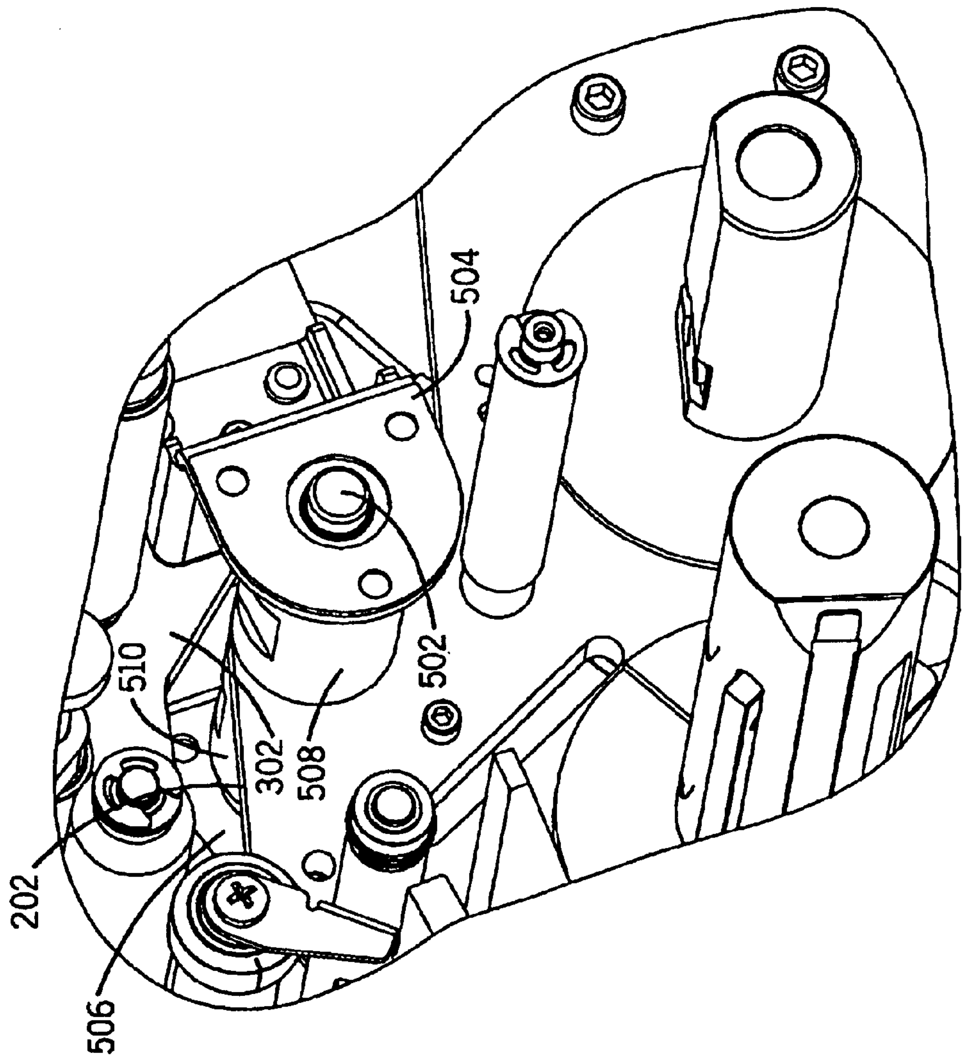
FIG. 23 is a detailed, right perspective view of the pivot connection of FIG. 1.
Figure 24:
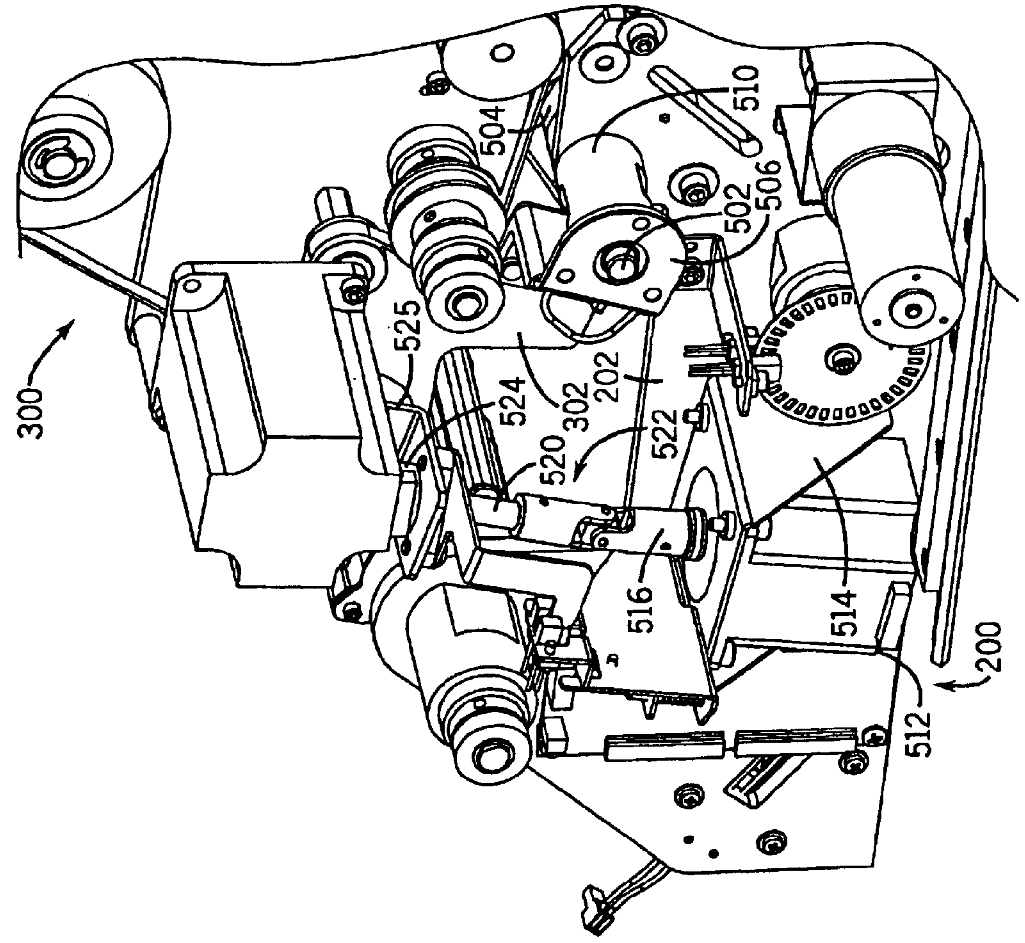
FIG. 24 is a detailed, left perspective view of the pivot motor of FIG. 3.
Figure 25:
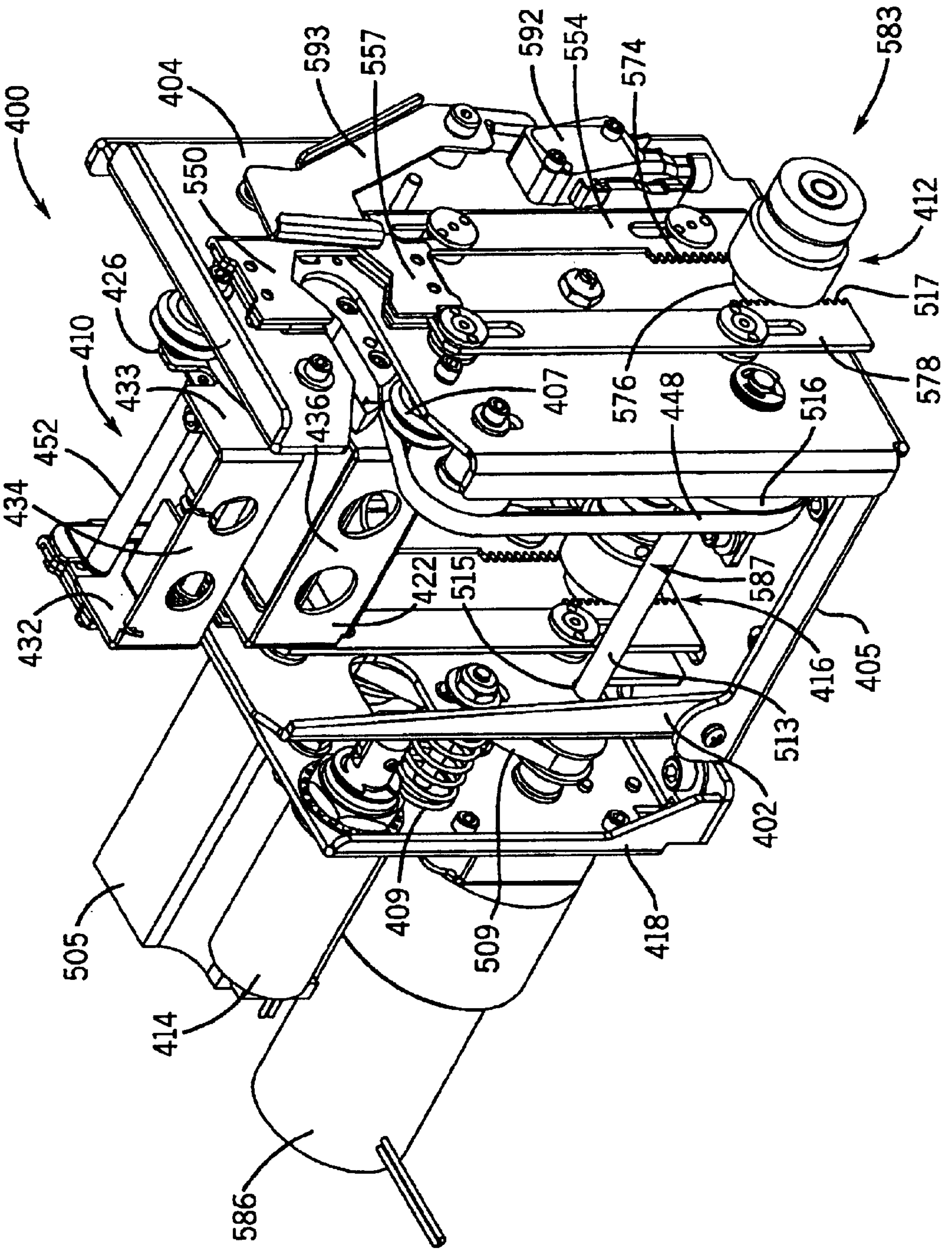
FIG. 25 is a perspective view of the label wrapper of FIG. 1.
Figure 26:
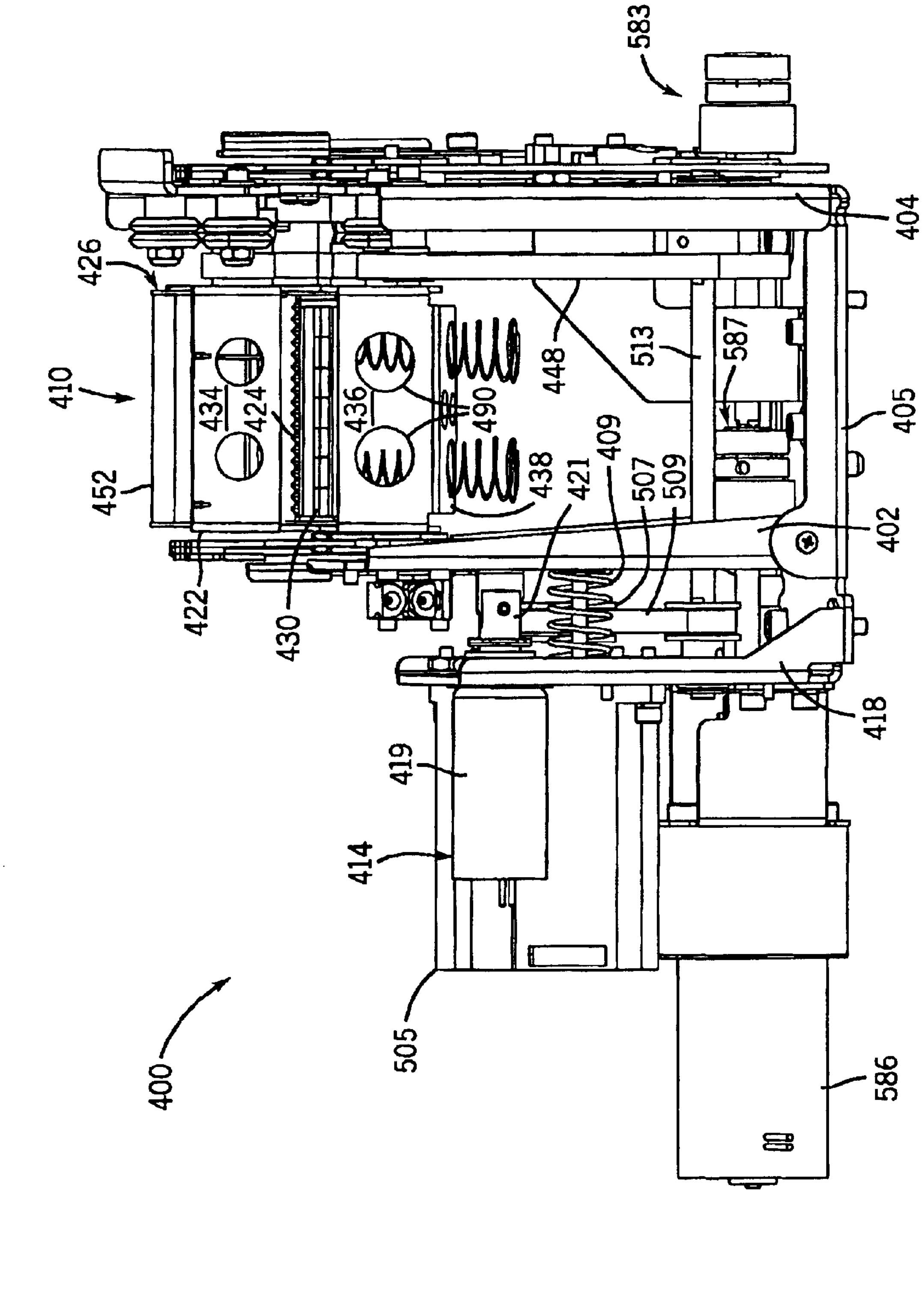
FIG. 26 is a front view of the label wrapper of FIG. 25.
Figure 27:
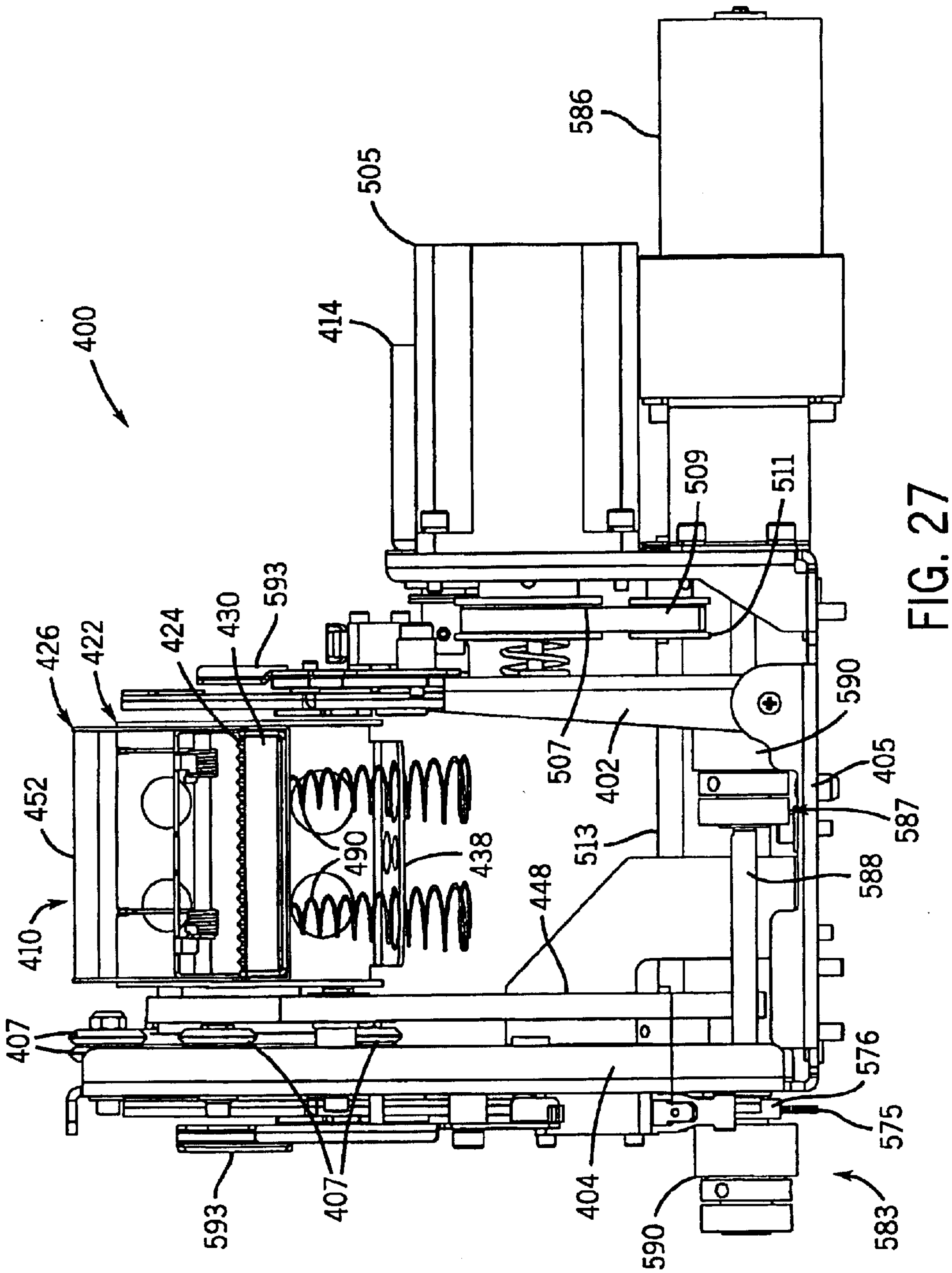
FIG. 27 is a rear view of the label wrapper of FIG. 25.
Figure 28:
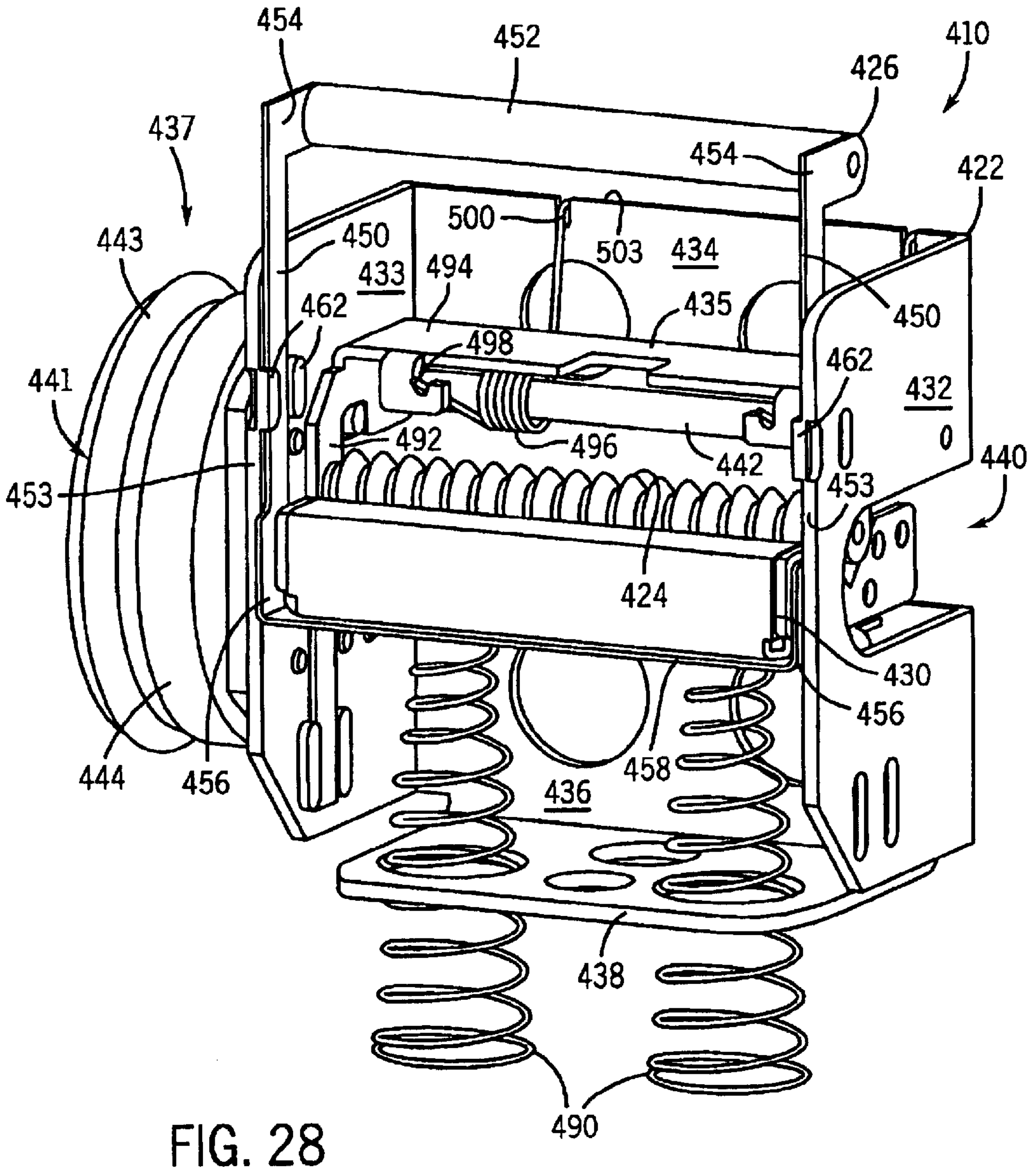
FIG. 28 is a rear perspective view of the wrapper subassembly of FIG. 25.
Figure 29:
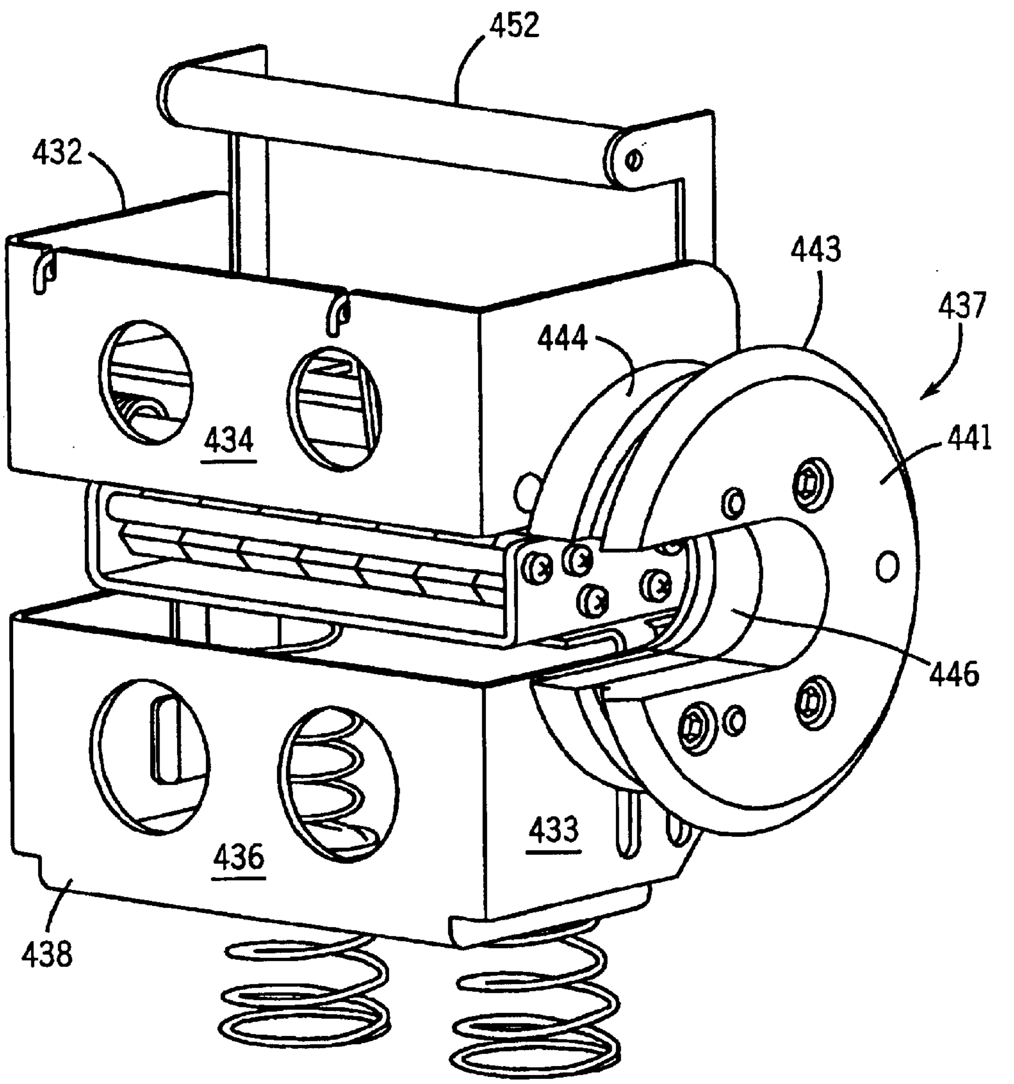
FIG. 29 is a front perspective view of the wrapper subassembly of FIG. 25.
Figure 30:
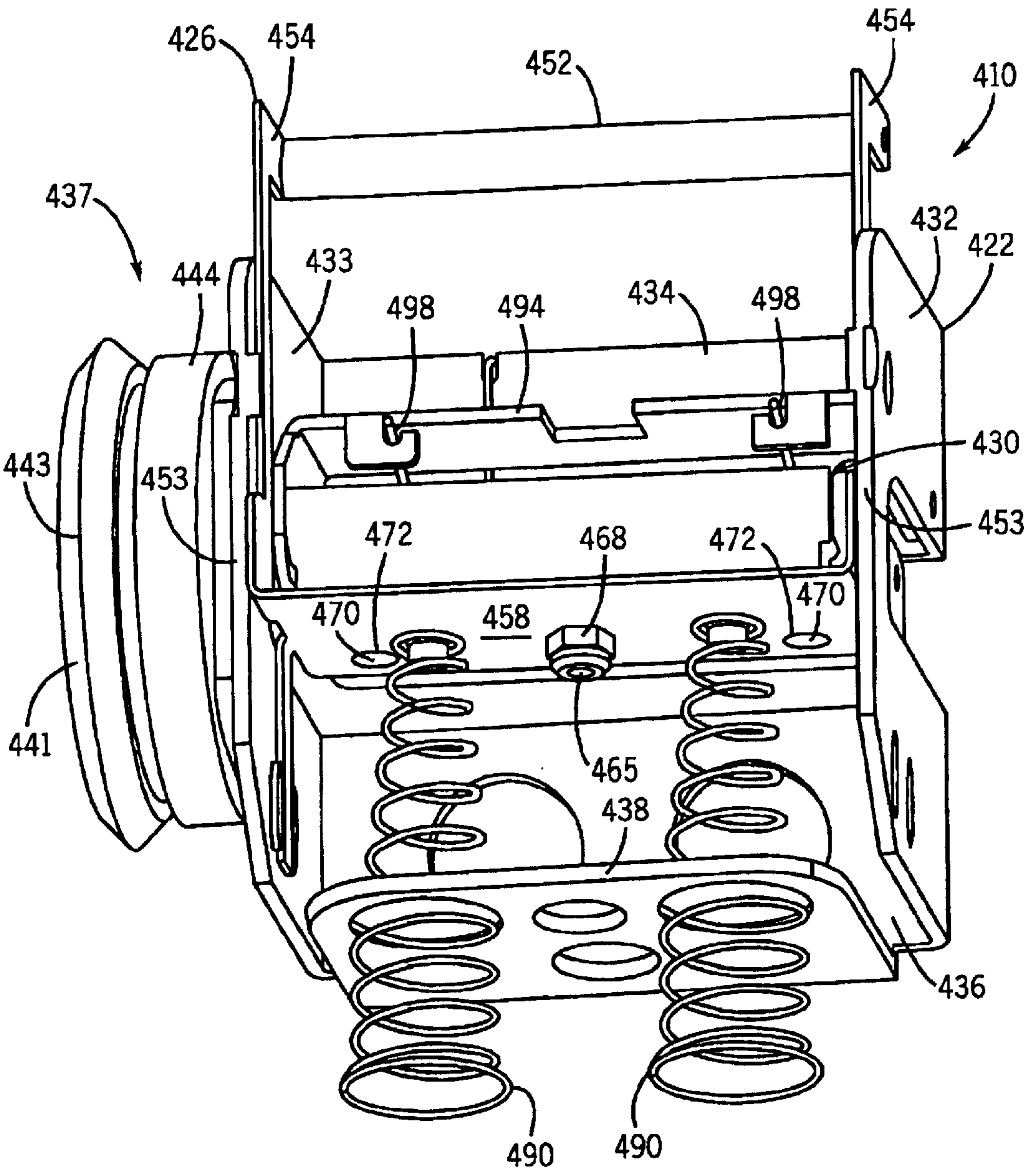
FIG. 30 is a rear, bottom perspective view of the wrapper subassembly of FIG. 25.
Figure 31:
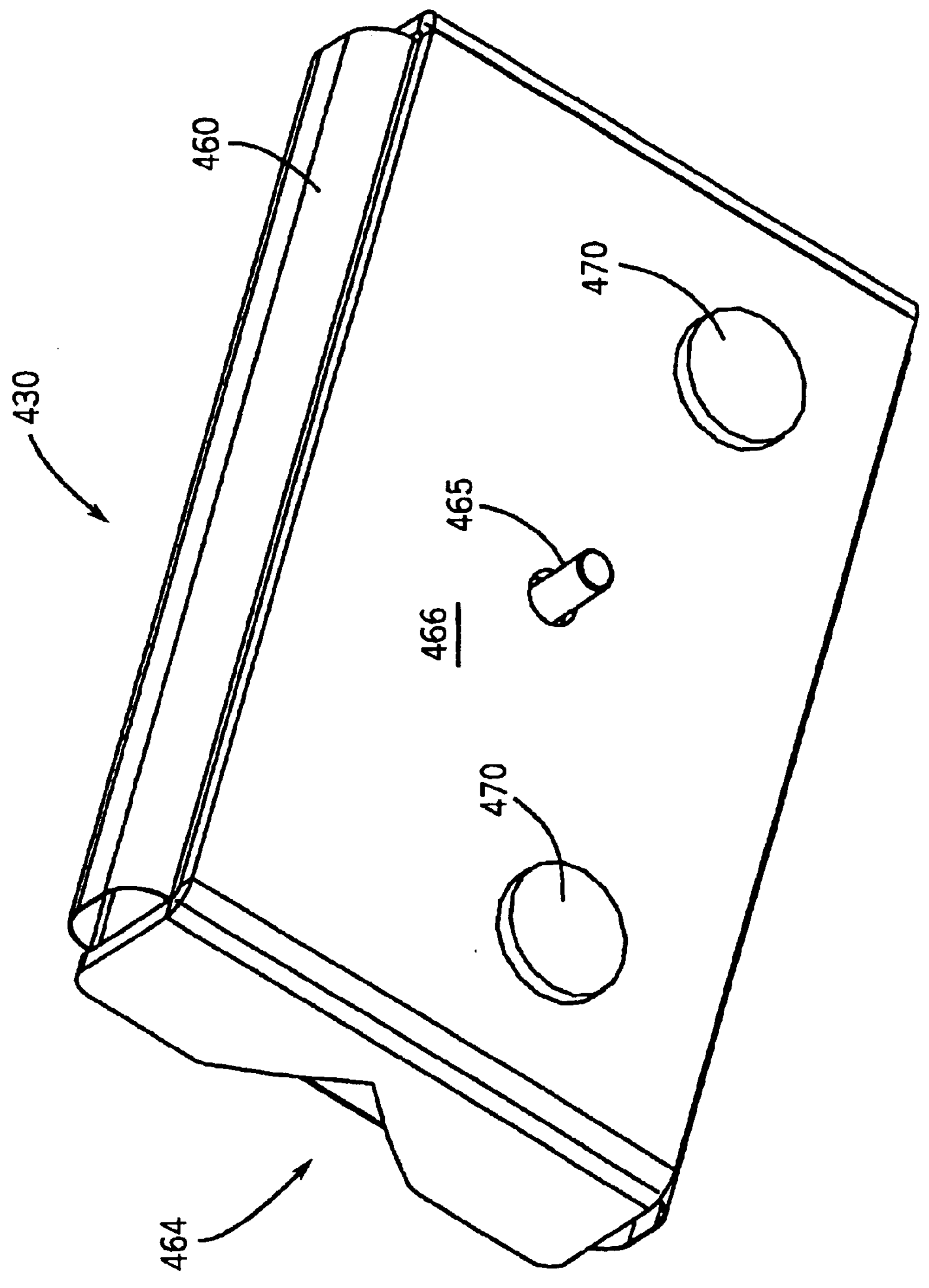
FIG. 31 is a bottom perspective view of the V-block assembly of FIG. 25.
Figure 32:
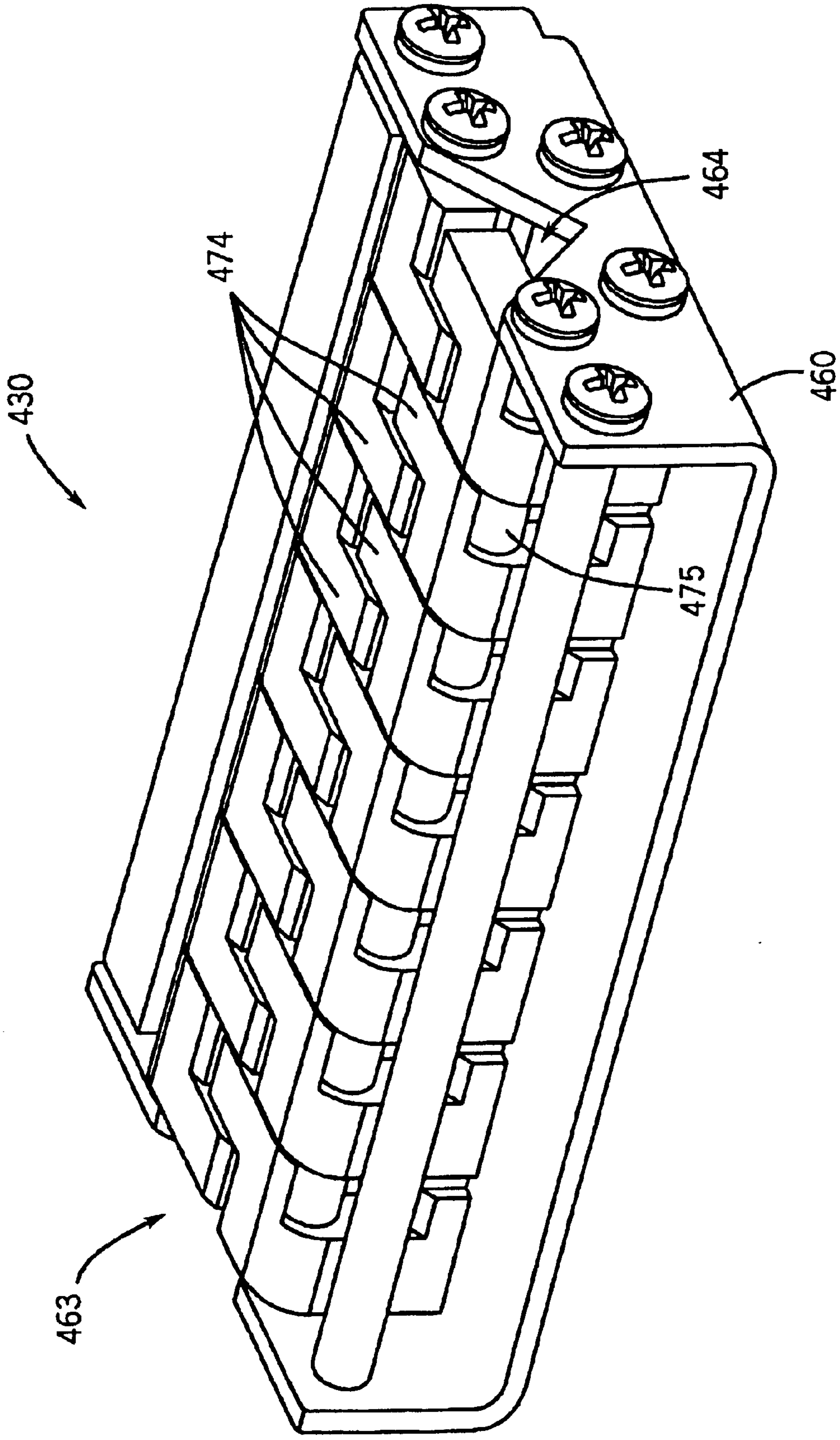
FIG. 32 is a top perspective view of the V-block assembly of FIG. 25.
Figure 36:
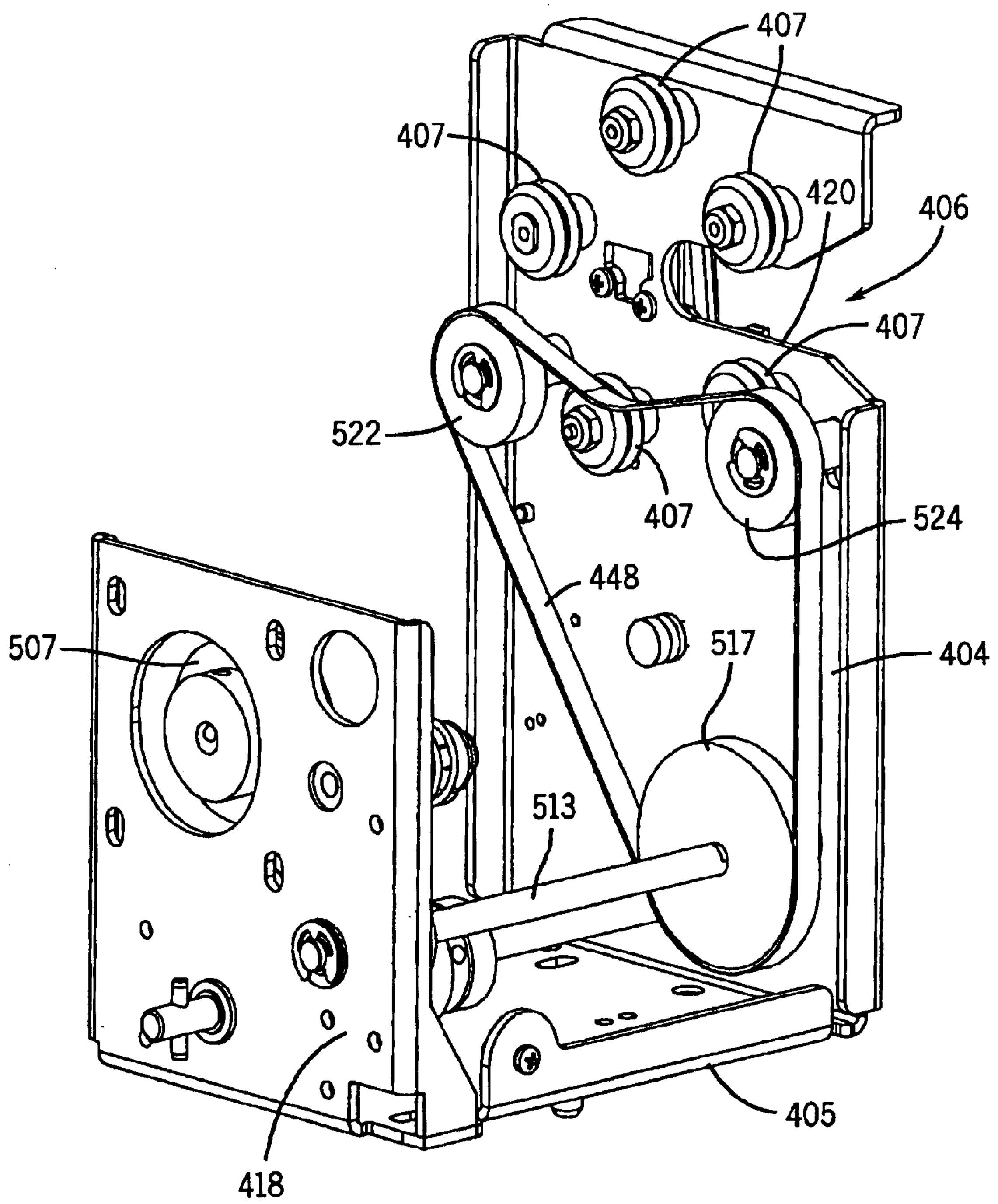
FIG. 36 is a left, front perspective view of the label wrapper of FIG. 25 partially disassembled showing the label wrapper drive system.
Figure 37:
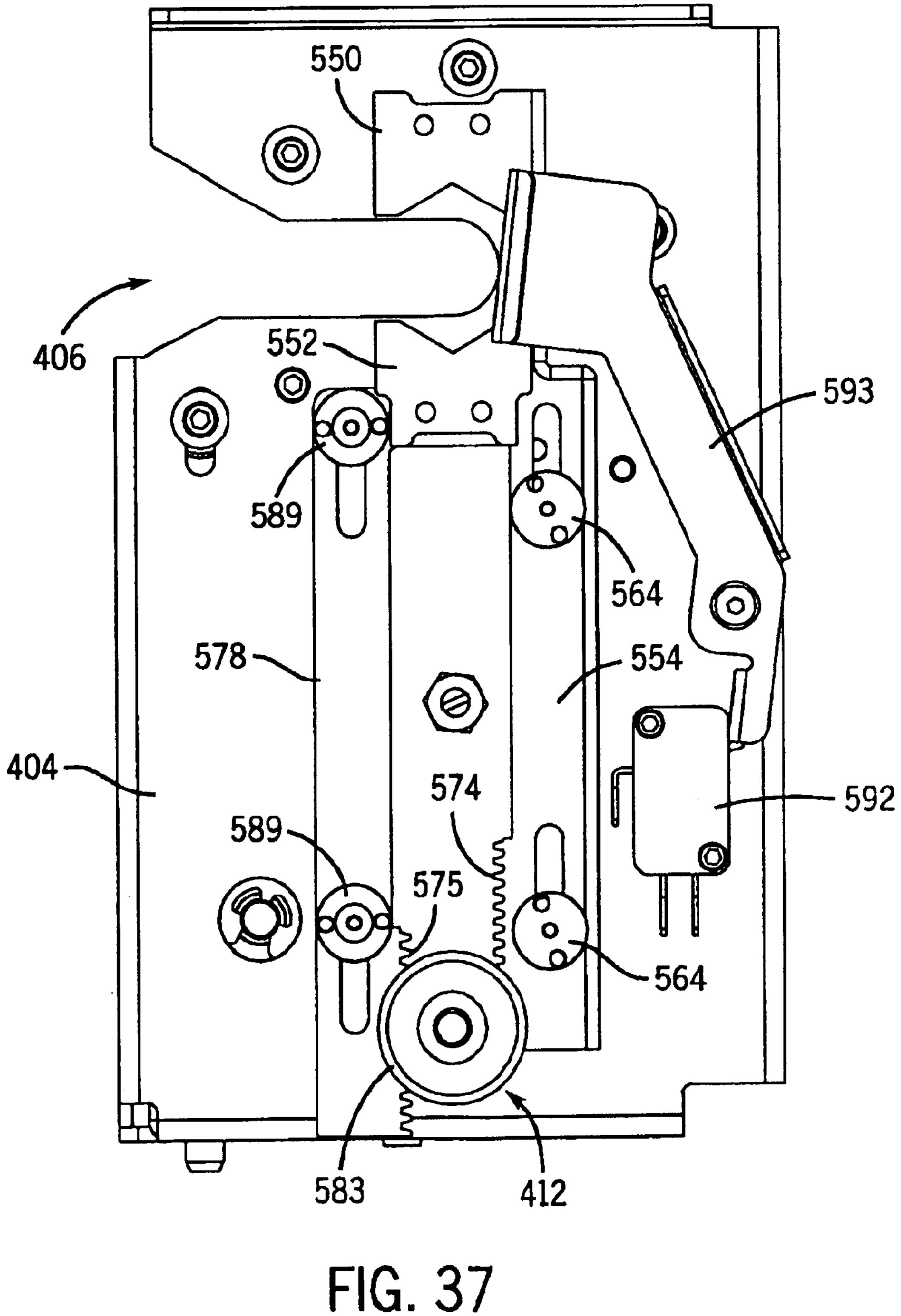
FIG. 37 is a right, front perspective view of a portion of the label wrapper of FIG. 25.
Figure 38:
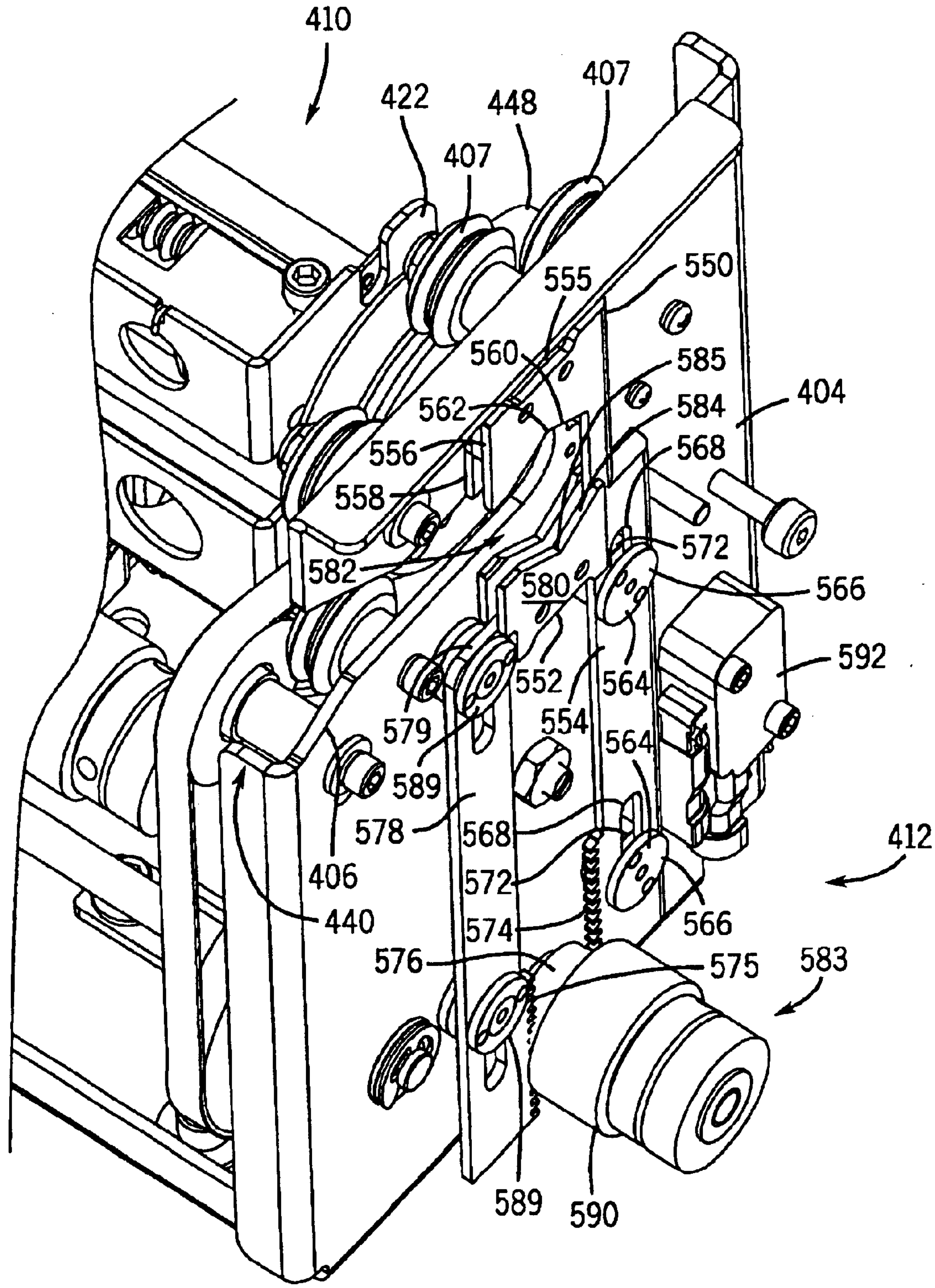
FIG. 38 is a detailed, top, right perspective view of the label wrapper of FIG. 25 with the limit switch actuating arm removed.

As shown in FIGS. 3, 23, and 24, the lower subassembly 200 and the upper subassembly 300 are interconnected by means of a pivot shaft 502 mounted through an aperture formed through the lower frame 202. Each end of the pivot shaft 502 is rotatably mounted to a pivot bracket 504, 506 mounted to opposing sides of the upper frame 302. The shaft 502 is supported in the pivot shaft aperture by hubs 508, 510 mounted to the lower frame 202.

A pivot motor 512 fixed to the lower frame 202 by a bracket 514 rotatably drives a shaft 516 that pivots the upper subassembly 300 about the pivot shaft 502 relative to the lower assembly 200. The shaft 516 is connected to a lead screw 520 by a universal joint 522. The lead screw 520 threadably engages a pivot nut 524 fixed to the upper frame 302 by a pivot bracket 525 rotatably mounted to the upper frame 302. Rotation of the lead screw 520 axially causes the pivot nut 524 to rotate the upper frame 302, and thus the entire upper subassembly 300, about the pivot shaft 502. Advantageously, the universal joint 522 allows the lead screw 520 to continue to rotate as the upper frame 302, and the pivot nut 524 connected thereto, pivots about the pivot shaft 502. Although a pivot motor rotatably driving a pivot shaft is disclosed, other methods for pivoting the upper assembly relative to the lower assembly can be used, for example, a pneumatic piston, rack and pinion, and the like, without departing from the scope of the invention.

Referring to FIGS. 2, 19, 20, and 25, pivotal movement of the upper subassembly 300 engages a striker 364 mounted to the front of the upper frame 302 with the label wrapper 400. The striker 364 is mounted to the front of the upper frame 302 via a bracket 366, and has a bottom surface 367 that contacts a striker roller 452 forming part of the label wrapper 400. The striker 364 urges the striker roller 452 downwardly which clears an opening in a wrapping assembly for insertion of a wire being wrapped with a label. Although a V-shaped striker bottom surface is disclosed, any shaped surface that engages the striker roller 452 to urge it downwardly can be used without departing from the scope of the invention.

Label Wrapper

Referring now to FIGS. 2, 19, 25–30, 36, and 37, the label wrapper 400 receives the printed labels and wraps the labels securely and accurately onto an object. Preferably, the object is a wire having a diameter between approximately 0.060 inches and 0.600 inches. In one embodiment of the current invention, the label wrapper 400 includes inner and outer support walls 402, 404 mounted to a bottom plate 405. The bottom plate 405 is rigidly fixed to the top wall 104 of the base 102. A wrapper subassembly 410 rotatably supported by the outer support wall 404 receives the label and revolves around the wire to wrap the label onto the wire.

The vertically extending outer support wall 404 supports the wrapper subassembly 410, and is rigidly mounted to the bottom plate 405. A forwardly opening slot 406 formed in the outer support wall 404 receives the wire for wrapping. Apertures are formed through the outer support wall 404 for shafts extending therethrough to rotatably drive the wrapper subassembly 410 and a jaw mechanism 412 mounted to the outer support wall 404.

The inner support wall 402 supports a jaw mechanism 416 that clamps onto the wire being wrapped, and is pivotally mounted to the bottom plate 405 to tension the wire. Preferably, the inner support wall 402 is biased toward the outer support wall 404 by a helical spring 409 compressed between the inner wall 402 and an upwardly extending bracket 418 fixed to the bottom plate 405. The nominal position of the inner support wall 402 is perpendicular to the bottom plate 405. The inner support wall 402 is shorter than the outer support wall 404, and extends to a height approximately equal to a lower edge 420 of the slot 406 formed in the outer support wall 404. Preferably, apertures are formed through the inner support wall 402 for shafts extending toward the outer support wall 404 to rotatably drive the wrapper subassembly 410 and the jaw mechanism 412, 416 mounted to the outer and inner support walls 404, 402.

The inner support wall 402 is urged away from the outer support wall 404 by a solenoid 414 to tension the wire between a jaw mechanism 412 mounted to the outer support wall 404 and the jaw mechanism 416 mounted to the inner support wall 402. The solenoid 414 has a coil 419 and an actuating shaft 421 coupled to the inner support wall 402 to pivot the inner support wall 402 away from the outer support wall 404 to tension the wire held by the jaw mechanisms 412, 416. The coil 419 is fixed relative to the bottom plate 405 by the upwardly extending bracket 418, and is actuated by, and electrically connected to, the microprocessor. Tensioning of the wire allows for consistent square placement of the label on the wire. Minor sags or kinks in the wire are removed by the tension of the wire. Tensioning the wire also positions the wire in the wrapper subassembly 410.

Wrapper Subassembly

The wrapper subassembly 410 is cantilevered from the outer support wall 404, and wraps a printed label from the label media 235 onto the wire. The wrapper subassembly 410 includes a frame 422 housing a serrated roller 424 and a slider 426 engagable with the striker 364 fixed to the upper frame 302 of the upper subassembly 300, A V-block assembly 430 is fixed to the slider 426, and biased toward the serrated roller 424.

The wrapper subassembly frame 422 slidably mounts the slider 426, and includes an inner and outer side wall 432, 433 joined by upper and lower front walls 434, 436. A bottom wall 438 extends rearwardly from the lower front wall 436. The C-shaped side walls 432, 433 define a rearwardly extending wire opening 440 between the upper and lower front walls 434, 436 for receiving the wire being wrapped. A pivot shaft 442 extends between the side walls 432, 433 for pivotally mounting a roller bracket 435. The opening 440 is aligned with the support wall slot 406 for receiving the wire when the wrapper subassembly 410 is not revolving around the wire received in the opening 440.

The wrapper subassembly frame 422 is cantilevered from the outer support wall 404 by a hub 437 engaging five support wheels 407 (shown best in FIG. 36) rotatably mounted to the outer support wall 404. The cantilevered wrapper subassembly frame 422 allows the inner side wall 432 to be located close to the end of the wire to be labeled. Advantageously, this results in the label being able to be positioned on the wire close to the end of the stationary wire or any termination or connector which may be already affixed to the wire.

The hub 437 engages the support wheels 407, and is fixed to the outer side wall 433 facing the outer support wall 404. The hub 437 includes an outer disc 441 having a circumferential V-shaped edge 443 and an inner sprocket 444 joined to, and coaxial with, the outer disc 441. An opening 446 formed in the disc 441 and sprocket 444 conforms to the opening 440 formed in the wrapper subassembly frame side walls 432, 433 for receiving a wire being wrapped. The sprocket 444, preferably, includes radially extending teeth for engaging a belt 448 rotatably driving the hub 437, and thus the wrapper subassembly 410, for wrapping a label on the wire.

The circumferential V-shaped edge 443 mates with the five support wheels 407 rotatably mounted to the outer support wall 404 to cantilever the wrapper subassembly frame 422. The wheels 407 are placed appropriately so that when the wrapper subassembly 410 rotates to a position where one wheel 407 is in the hub opening 446, the other four wheels 407 continue to support the wrapper subassembly 410. Preferably, the rotational axis of two of the five support wheels 407 are fixed while the other three support wheels 407 are adjustable relative to the hub 437. The two fixed support wheels 407 support the wrapper subassembly 410 in the proper position on the outer support wall 404 while the three adjustable support wheels 407 are drawn tight against the hub 437, taking out any lash or clearance. Although an outer disc 441 having a V-shaped circumferential edge 443 that mates with support wheels 407 is shown, any structure for retaining the hub 437 relative to the outer support wall 404 can be provided, such as wheels having a circumferential V-shaped edge that mates with an outer disc having a circumferential V groove, without departing from the scope of the invention.

The slider 426 is slidably mounted in the wrapper subassembly frame 422, and includes two vertical legs 450 extending downwardly into the wrapper subassembly frame 422 proximal rear edges 453 of the wrapper subassembly frame side walls 432, 433. Each leg 450 is adjacent to one of the wrapper subassembly frame side walls 432, 433, and has an upper end 454 and a lower end 456. The lower ends 456 extend downwardly into the wrapper subassembly frame 422 rearwardly of the opening 440 in the wrapper subassembly frame side walls 432, 433, and are joined by a bottom wall 458 supporting the V-block assembly 430. The upper ends 454 are joined by the striker roller 452. Guides 462 fixed to the wrapper subassembly frame side walls 432, 433, guide the slider legs 450 as they slidably move relative to the wrapper subassembly frame 422.

V-Block Assembly

Referring to FIGS. 28 and 30–32, the V-block assembly 430 presses the printed label onto the wire, and includes a base 460 having top face 463 with a transverse V channel 464 formed therein for receiving a wire being wrapped and a bottom face 466. The base 460 is fixed to the slider bottom wall 458 between the lower ends 456 of the slider vertical legs 450. The channel 464 formed in the V-block base top face 463 guides the wire being wrapped into substantial alignment with the axis of rotation of the wrapper subassembly frame 422. Preferably, the V-block assembly bottom face 466 includes a threaded post 465 that extends through an aperture formed in the slider bottom wall 458 and threadably engages a nut 468 to secure the V-block assembly 430 to the slider 426. A pair of alignment posts 470 extending from the bottom face 466 and through alignment openings 472 formed in the slider bottom wall 458 can be provided to properly position the V-block assembly 430 in the slider 426.

In one embodiment, the V-block assembly base 460 includes interdigitated spring biased fingers 474 that form a platter for supporting a wire being wrapped. The fingers 474 are pivotally supported by transverse pins 475 fixed to the base 460, and deflect to form the channel 464. The fingers 474 that comprise the platter are able to flex independently of each other, and apply the label substantially uniformly to the wire even if the wire is not perfectly straightened out within the channel 464. Advantageously, the spring biased fingers 474 in the V-block assembly 430 require no tooling changes for wire diameters between approximately 0.060" and 0.600".

Although a V-block assembly 430 having a biasing structure, such as the deflectable fingers is shown, in a preferred embodiment, shown in FIGS. 33–35, the V-block assembly 430' has a base 460' with a transverse channel 464' formed therein, and the transverse channel 464' is covered by a biasing sleeve 476 having a non-stick surface 478. The non-stick surface 478 can apply the label substantially uniformly to the wire even if the wire is not perfectly straightened out within the channel 464'.

In the V-block assembly 430' shown in FIGS. 33–35, the base 460' is formed from a solid material, such as plastic, having the transverse channel 464' formed in a top surface. Most preferably, the sleeve 476 is slipped over the base 460', and includes a non-stick fabric 480, such as a Teflon coated or impregnated fiberglass fibers, silicon coated or impregnated fabric, and the like, which provides the non-stick surface 478 covering the channel 464'. Of course, the sleeve 476 can be provided with the V-block assembly 430 shown in FIG. 28, without departing from the scope of the invention.

As shown in FIG. 35, the fabric 480 is stretched over the channel 464' by a U-shaped flexible support 482, such that the fabric 480 is biased out of the channel 464' formed in the base 460'. The support 482 includes a bottom wall 484 with legs 486 extending from transverse edges of the base 460', and wraps around the bottom 487 and sides 488 of the V-block base 460'. The legs 486 of the U-shaped support 482 are biased outwardly away from the base sides 488 to stretch the fabric 480 over the channel 464'. The fabric 480 provides all of the advantages of the fingers, and in addition, provides a more uniform pressure on the label being applied to the wire regardless of the size of the label.

In the embodiment disclosed in FIGS. 33–35, edges of the fabric 480 are crimped against the support legs 486 to secure the fabric to the support 482, however, any method can be used to stretch the fabric 480 over the channel 464', such as a sleeve formed from the fabric in the form of a cylinder that slips over the base, a support having only one biased leg, fabric secured to a support using adhesives, rivets, sewing, and the like, without departing from the scope of the invention.

Referring back to FIGS. 2 and 26–31, the slider 426, and thus the V-block assembly 430, is biased upwardly by a pair of helical springs 490 interposed between the slider bottom wall 458 and wrapper subassembly frame bottom wall 438. As described in more detail below, the striker roller 452 is contacted by the striker 364 on the upper subassembly 300 to move the slider 426 in a vertical direction against the urging of the springs 490 away from the serrated roller 424 to provide space for inserting a wire between the V-block assembly 430 and serrated roller 424. Upon disengagement of the striker 364 from the striker roller 452, the springs 490 urge the V-block assembly 430 upwardly toward the serrated roller 424 that urges the wire into the channel 464. Although a pair of helical springs 490 biasing the V-block assembly 430 upwardly is disclosed, any biasing mechanism can be used, such as an elastomeric material, leaf spring, and the like, without departing from the scope of the invention.

Serrated Roller

The serrated roller 424 works with the V-block assembly 430 to keep the wire positioned correctly with respect to the label by urging the wire into the channel 464 against the biasing structure of the V-block assembly 430. The serrated roller 424 is supported above the V-block assembly 430 by the roller bracket 435, and includes a non-stick surface, such as provided by a roller formed from polytetrafluoroethylene, which does not readily adhere to adhesives on the label. Advantageously, the serrations formed in the serrated roller 424, and the use of polytetrafluoroethylene or similar material, keep the adhesive from the printed label from sticking to the serrated roller 424 should the adhesive surface of the printed label come into contact with the serrated roller 424. Although a serrated roller is disclosed to minimize the area of the roller engaging the label, a non-serrated roller having any type of surface, such as a surface formed from an elastomeric material, metal, plastic, and the like, can be provided without departing from the scope of the invention.

The roller bracket 435 supports the serrated roller 424 between a pair of arms 492 joined by a cross plate 494. Each arm 492 extends rearwardly from the pivot shaft 442, and rotatably supports one end of the serrated roller 424. The bracket 435 is biased toward the V-block assembly 430 about the pivot shaft 442 by a torsion spring 496 wrapped around the pivot shaft 442. The torsion spring 496 urges the serrated roller 424 into engagement with the wire. The spring 496 has one end 498 engaging the bracket 435, and another end 500 hooked around a top edge 503 of the wrapper subassembly frame upper front wall 434.

Wrapper Assembly Drive System

A wrapper assembly drive system rotatably drives the wrapper subassembly 410 to wrap the printed label onto the wire. Referring now to FIGS. 25–28, 30, and 36, the wrapper assembly drive system includes a stepper motor 505 having a rotating shaft. The rotating shaft rotatably drives a pulley 507. A belt 509 driven by the pulley 507 rotatably drives a second pulley 511 attached to one end of a second shaft 513 rotatably mounted between the bracket 418 and the outer support wall 404. The second shaft 513 extends through an oversized aperture 515 formed in the inner support wall 402. A drive gear 517 fixed to an opposing end of the second shaft 513 engages the belt 448 to rotatably drive the hub 437. Advantageously, this drive system rotatably drives the wrapper subassembly 410 without interfering with the user inserting a wire into the wrapper subassembly 410 for wrapping a label thereon when the wrapper subassembly 410 is not being rotatably driven.

Preferably, the belt 448 is a cogged timing belt including laterally extending teeth extending between edges of the belt 448. The belt teeth engage the teeth radially extending from the sprocket 444 to rotatably drive the hub 437. Although a cogged timing belt is disclosed, any power transmission means can be used, such as a non-cogged drive belt, a chain, shaft drive, gear drive assembly, and the like, without departing from the scope of the invention.

First and second idler gears 522, 524 are rotatably mounted to the outer support wall 404, and engage the timing belt 448 to guide the belt 448 into engagement with the sprocket 444. Preferably, the first and second idler gears 522, 524 urge the "back" side of the belt 448 to wrap around the wrapper sprocket 444, such that the belt 448 remains engaged with the sprocket 444 as the wire opening 440 is closed by the belt 448 during rotation of the hub 437. Preferably, at least one of the idler gears 522, 524 is adjustable to properly tension the belt 448.

Jaw Mechanisms

Referring now to FIGS. 25–27, 37, and 38, the jaw mechanisms 412, 416 mounted to each support wall 402, 404 clamp onto the wire being wrapped with the printed label by the wrapper subassembly 410. Each jaw mechanism 412, 416 includes upper and lower V-shaped jaws 550, 552 that clamp onto the wire inserted into the wrapper subassembly frame wire openings 440. The jaw mechanisms 412, 416 are substantially identical. Thus, the jaw mechanism 412 mounted to the outer support wall 404 will be described with the understanding that the description applies to the other jaw mechanism 416 mounted to the inner support wall 402.

The upper V-shaped jaw 550 presses downwardly against the wire, and includes a downwardly extending leg 554 having an upper portion 555 sandwiched between a pair of upper jaw plates 556, 558. The upper jaw plates 556, 558 and leg upper portion 555 are welded together to form a single piece. The jaw plates 556, 558 define a downwardly opening V-shape 560 that engages the wire. The V-shape 560 has an apex 562 substantially aligned with, and above, the rotational axis of the wrapper subassembly frame 422 to position the wire along the rotational axis of the wrapper subassembly frame 422.

The upper jaw leg 554 supports the upper jaw plates 556, 558, and extends downwardly toward the bottom plate 405 rearwardly of the opening slot 406 formed in the outer support wall 404 for receiving the wire. The upper jaw leg 554 is slidably fixed to the outer support wall 404 by a pair of pins 564. Each pin 564 includes a head 566, and extends through an elongated slot 568 formed in the upper jaw leg 554 and a spacer 572 interposed between the leg 554 and the outer support wall 404. The leg 554 is sandwiched between the head 566 and spacer 572 to slidably fix the leg 554 to the outer support wall 404. The leg 554 includes a toothed rack 574 engagable with a pinion 576 to slidably drive the upper jaw 550 into and out of engagement with the wire.

The lower V-shaped jaw 552 presses upwardly against the wire, and includes a downwardly extending lower jaw leg 578 having an upper portion 579 sandwiched between a pair of lower jaw plates 580, 582. The lower jaw plates 580, 582 and leg upper portion 579 are welded together to form a single piece. The lower jaw plates 580, 582 define an upwardly opening V-shape 584 having a junction 585 that is substantially aligned with the apex 562 of the upper V-shaped jaw 550 for clamping a wire therebetween.

The lower jaw leg 578 supports the lower jaw plate 580, 582, and extends downwardly toward the bottom plate 405. The lower jaw leg 578 is slidably fixed to the outer support wall 404 by a pair of pins 589, such as described for the upper jaw leg 554. The lower jaw leg 578 includes a toothed rack 575 facing the upper jaw leg toothed rack 574. The lower jaw leg toothed rack 575 is engagable with the pinion 576 to slidably drive the lower jaw 552 into and out of engagement with the wire.

Each jaw mechanism 412, 416 is driven by a separate pinion head assembly 583, 587 rotatably driven by a drive motor 586 rotatably driving a rotatable shaft 588. Each pinion head assembly 583, 587 includes the pinion 576 engaging the toothed racks 574, 575 and a slip clutch 590 driving the pinion 576. The shaft 588 is coupled to the pinion head assemblies 583, 587 to rotatably drive the slip clutches 590, and thus the pinions 576 to move the V-shaped jaws 550, 552. Each slip clutch 590 slips at a predetermined torque which allow the jaw mechanisms 412, 416 to act independently of each other while being driven by the same drive motor 586. Advantageously, separate slip clutches 590 allow one jaw mechanism 416 to clamp onto a terminal crimped onto the wire while the other jaw mechanism 412 clamps onto the wire which has a much smaller diameter than the terminal.

Limit switches 592 mounted to the inner and outer support walls 402, 404 have actuating arms 593 that extend across the wrapper assembly openings 440, such that the limit switches 592 are actuated when a wire is inserted into the wrapper assembly opening 440 for wrapping a label thereon. The limit switches 592 are electrically connected to the microprocessor, and provide a signal to the microprocessor when actuated. Advantageously, a limit switch 592 mounted to each support wall 402, 404 ensures that the wire is fully inserted, and substantially aligned with the axis of the rotation of the wrapper subassembly 410 prior to initiating operation of the label applicator 10.

Label Applicator Operation

In operation, with reference to FIGS. 1–43, the printer 50 is first set up as shown in FIG. 2. A roll of thermal transfer ribbon 224 is mounted onto the ribbon unwind spool 204 so that the ribbon 224 feeds from the top of the roll. The ribbon 224 is then fed underneath the first ribbon guide post 216, over the top of the second ribbon guide post 217, over the print head assembly 220, and to the ribbon rewind spool 206. Preferably, the used ribbon 224 is wound directly around the ribbon unwind spool 206. However, a core can be mounted on the ribbon rewind spool 206 to receive the used ribbon 224 without departing from the scope of the invention.

Label media 235 wound onto the label spool 232 is mounted onto the mounting block assembly 240 such that the label media 235 feeds off of the top of the spool 232. The label media 235 is then fed over the first label media guide idler roller 312. From the first label media guide idler roller 312, the label media 235 is fed between the first drive roller 316 and nip roller 314. From the first drive roller 316, the label media 235 is fed underneath the platen roller 318, around the dispensing edge 330 of the peel plate 328, underneath the web guide idler roller 336, between the second drive roller 320 and second nip roller 342, and up to the label rewind spool assembly 308. The label media 235 less the printed labels is wound directly onto the spool mounting block 348. Of course, a core can be provided that is mounted onto the spool mounting block 348 to receive the label media 235.

Figure 39:
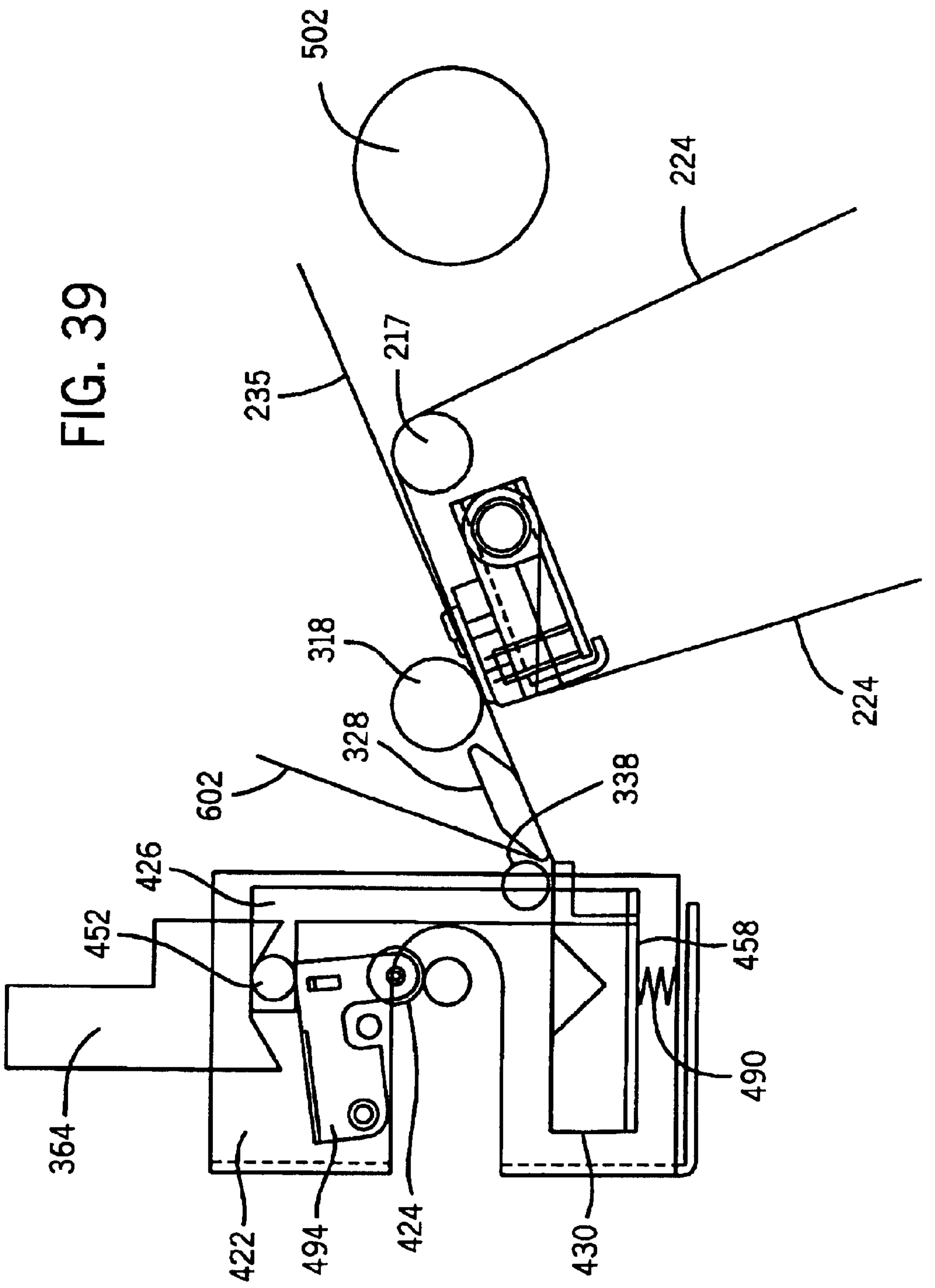
FIG. 39 is a right side view of the apparatus of FIG. 1, with the wrapper subassembly removed, showing the apparatus in the print position.

Once the printer 50 has been set up, and the ribbon 224 and label media 235 have been loaded as described above, the printer 50 starts in a print position, as shown in FIG. 39. In the print position, the lead screw drive nut 136 of the base assembly 100 is in its full forward position (furthest from the first pulley 142), thereby placing the shuttle plate 150, and therefore also the lower subassembly 200 and upper subassembly 300, in their full forward positions. In addition, the pivot lead screw drive nut 524 is also in its full forward position (furthest from the pivot motor 512), thereby placing the upper subassembly 300 in its farthest counterclockwise position (when viewed from the right side of the apparatus) as it rotates about the pivot shaft 502. This positioning causes the platen roller 318 to be loaded firmly against the print head assembly 220.

With the upper subassembly 300 in the full forward position, the striker 364 is forced down against the striker roller 452 causing the slider 426, and therefore the V-block assembly 430, to be moved down and the springs 490 between the slider 426 and the wrapper subassembly frame 422 to be compressed, to a point wherein the top surface of the V-block assembly 430 is slightly below the dispensing edge 330 of the peel plate 328 and the O-rings 340 of the label deflector 338. The wrapper subassembly frame 422 supporting the V-block assembly 430 is in a home position, wherein the upper and lower front walls 434, 436 of the wrapper subassembly frame 422 face forwardly (away from the printer 50) for receiving a wire therebetween into the wire opening 440 formed by the C-shaped side walls 432, 433.

Actuation of the label applicator 10 is initiated by inserting the wire into the openings 440 formed in the label wrapper subassembly 410, and engaging the actuator arms 593 extending across the openings 440 to actuate the limit switches 592. Upon tripping both of the limit switches 592, the V-shaped jaws 550, 552 clamp onto the wire, and the solenoid 414 pivots the inner support wall 402 to tension the portion of the wire extending between the support walls 402, 404.

Once the wire is secured between the support walls 402, 404 in the label wrapper subassembly 410, the printer 50 prints on a label fed between the print head assembly 220 and platen roller 318 to form a printed label 600. During printing, the ribbon 224 is fed by the friction between the print head assembly 220, the label media 235, and the platen roller 318. As the label media 235 is fed past the dispensing edge 330 of the peel plate 328, the printed label 600 separates from the web 602 and is fed forward towards the O-rings 340 of the label deflector 338.

Figure 40:
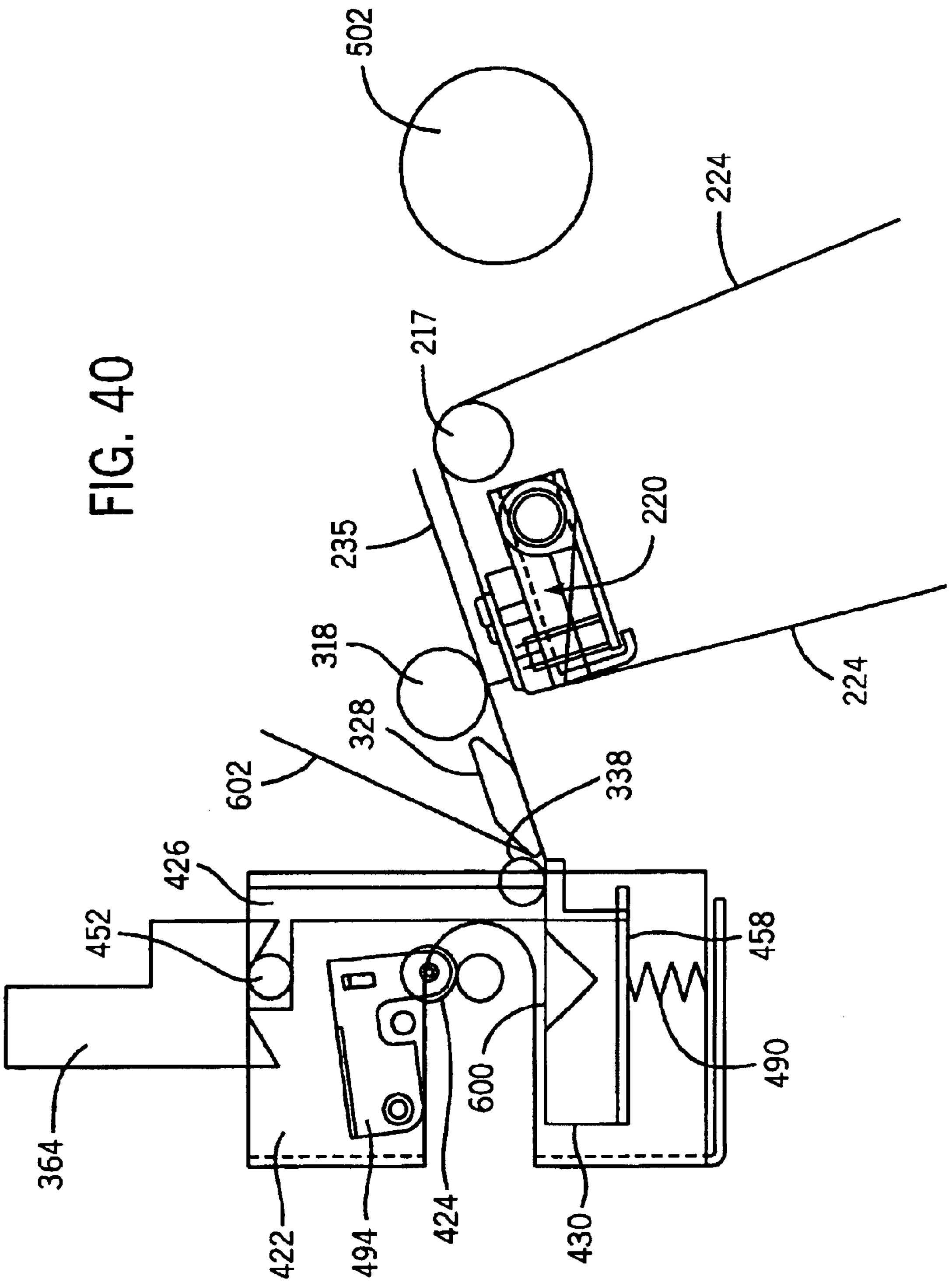
FIG. 40 is a right side view of the apparatus of FIG. 1, with the wrapper subassembly removed, showing the apparatus in the dispense position.

Once the printed label 600 has been printed, the microprocessor sends a signal to the pivot motor 512 to move the printer 50 into a dispense position, as shown in FIG. 40. Upon receipt of the signal, the pivot motor 512 drives the pivot lead screw 520 to pull the pivot lead screw drive nut 524 toward the pivot motor 512, thereby rotating the upper subassembly 300 around the pivot shaft 502. When the upper subassembly 300 rotates, the front of the upper subassembly 300, including the platen roller 318 and the striker 364, move upward. As the platen roller 318 moves upward, it is disengaged from the print head assembly 220, thereby stopping the ribbon 224 from advancing. As the striker 364 moves upward, the slider 426, and therefore the V-block assembly 430, also move upward due to the force of the springs 490. The slider 426 and the V-block assembly 430 are moved to a position wherein the top surface of the V-block assembly 430 is slightly below the dispensing edge 330 of the peel plate 328 and the O-rings 340 of the label deflector 338 are slightly above the top surface of the V-block assembly 430.

Once the printer 50 is in the dispense position the microprocessor sends a signal to the second stepper motor 354. Upon receipt of the signal, the second stepper motor 354 drives the label rewind spool assembly 308 and the second drive roller 320 via the belt 321, which advances the label media 235 to dispense the printed label 600. The printed label 600 is dispensed flat with the adhesive side up between the top surface of the V-block assembly 430 and the O-rings 340, and is dispensed to a point where the front edge of the printed label 600 is just past the wire placed into the label wrapper 400. The O-rings 340 contact the adhesive side of the printed label 600 and cause the printed label 600 to be fed out substantially flat onto the top surface of the V-block assembly 430. Because the platen roller 318 has been withdrawn from the print head assembly 220, the ribbon 224 is not advanced while the printed label 600 is being dispensed since there is no more friction between the ribbon 224 and the label media 235 to move the ribbon 224.

Figure 41:
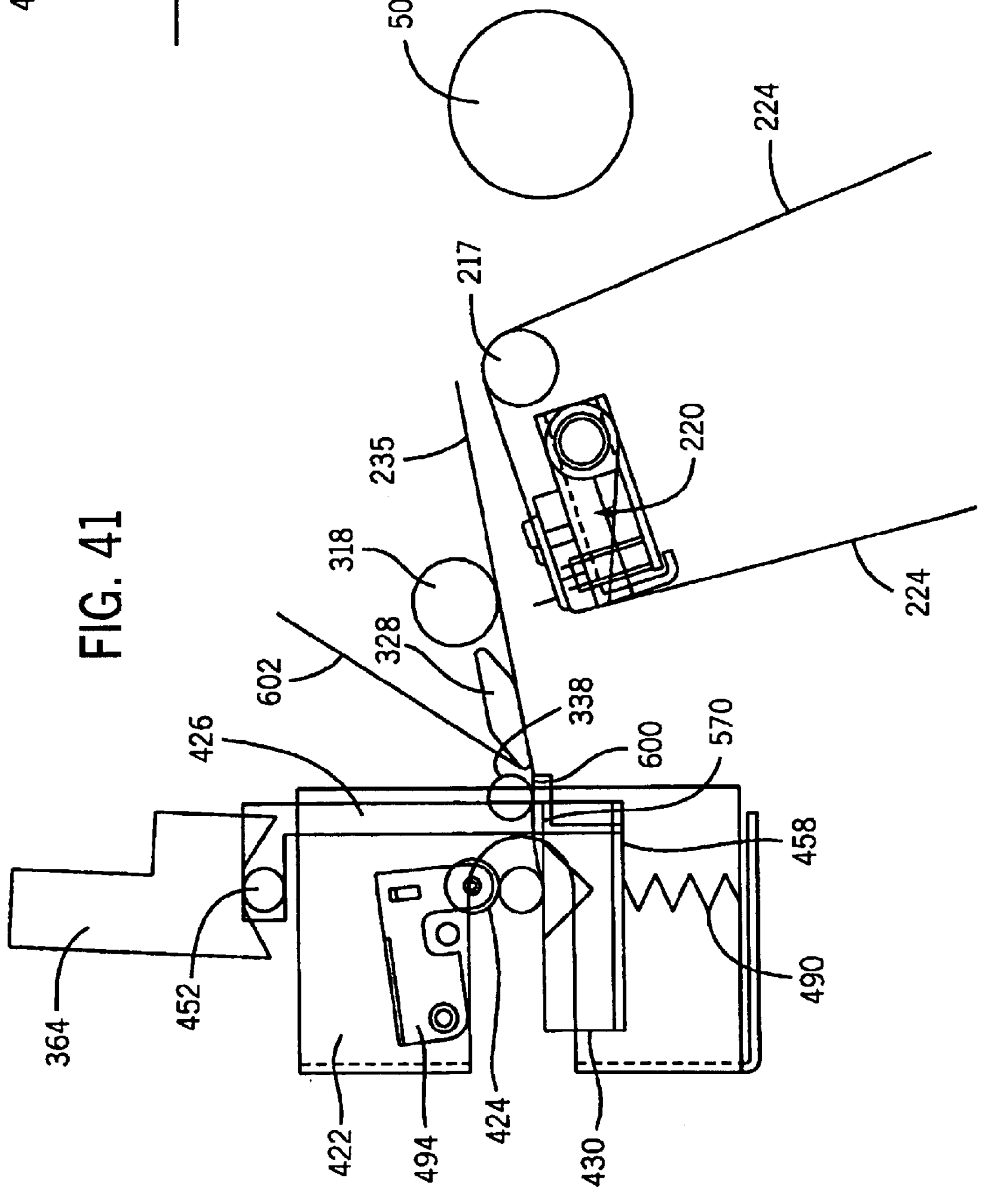
FIG. 41 is a right side view of the apparatus of FIG. 1, with the wrapper subassembly removed, showing the apparatus in the apply position.

Once the printed label 600 has been dispensed, the microprocessor sends a signal to the pivot motor 512 to move the printer 50 into the apply position, as shown in FIG. 41. Upon receipt of the signal, the pivot motor 512 drives the pivot lead screw 520 to pull the pivot lead screw drive nut 524 further toward the pivot motor 512, thereby rotating the upper subassembly 300 further around the pivot shaft 502.

When the upper subassembly 300 rotates, the front of the upper subassembly 300, including the striker 364, moves further upward. As the striker 364 moves further upward, the slider 426, and therefore the V-block assembly 430, also move further upward due to the force of the springs 490 between the slider 426 and the wrapper subassembly frame 422. The slider 426 and the V-block assembly 430 are moved to a position wherein the wire is trapped between the serrated roller 424 and the fingers 474, in the V-block assembly 430. Advantageously, the fingers 474 urge the wire toward the serrated roller 424.

In this position, the printed label 600 is adhered squarely to the wire at a line contact near the leading edge of the printed label 600 by the V-block assembly 430. Preferably, the wire contacts the printed label 600 slightly behind the leading edge of the printed label 600 leaving the majority of the printed label 600 behind the wire. Because the printed label 600 is still adhered to the web 602 while being dispensed and making contact with the wire, the printed label 600 will be squarely aligned with the wire when it is adhered.

Figure 42:
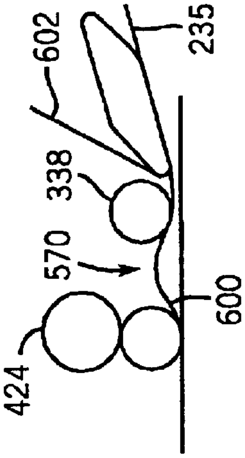
FIG. 42 is a detailed view of the slack formed in the label in FIG. 41.

Once the printer 50 is in the apply position, and the printed label 600 has been adhered to the wire, the second stepper motor 354 drives the label rewind spool assembly 308 and the second drive roller 320 via the belt 321, to further advance the label media 235. The label media 235 is advanced slightly, as shown in FIG. 42, so that any tension in the printed label 600 is removed and slack is formed in the printed label 600 so that slack, such as in the form of a "bubble" 570 is formed in the printed label 600 between the peel plate 328 and the wire. The slack prevents the printed label 600 from being pulled off of the wire when the printer 50 moves to the shuttle position rearwardly away from the label wrapper 400, as described in more detail below.

Figure 43:
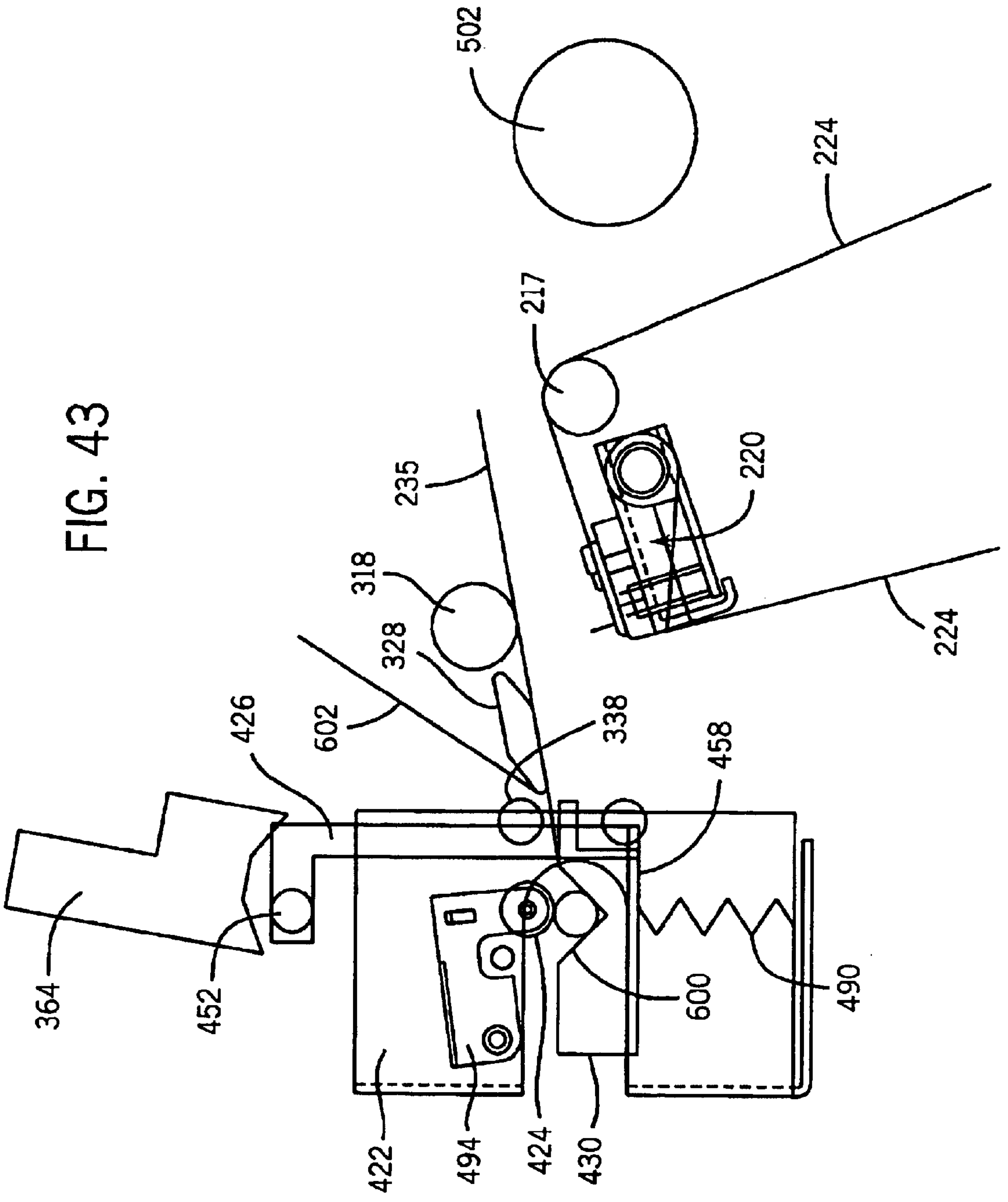
FIG. 43 is a right side view of the apparatus of FIG. 1, with the wrapper subassembly removed, showing the apparatus in the shuttle position.

Once the slack has been formed in the printed label 600, the printer 50 moves to a shuttle position away from the label wrapper 400, as shown in FIG. 43. To get to the shuttle position, the pivot motor 512 drives the pivot lead screw 520 to pull the pivot lead screw drive nut 524 further toward the pivot motor 512, thereby rotating the upper subassembly 300 further around the pivot shaft 502.

When the upper subassembly 300 rotates, the front of the upper subassembly 300, including the striker 364, moves further upward until the striker 364 breaks contact with the striker roller 452. At this point the slider 426, and therefore the V-block assembly 430, will be at their maximum upward position causing the wire to be pressed into the V-block assembly 430 against the urging of the biased fingers 474, or fabric 480. In this position, the wire is secured between the V-block assembly 430 and the serrated roller 424, which holds the wire centered while the printed label 600 is wrapped onto the wire.

Once the printer 50 is in the shuttle position, the upper subassembly 300 and the lower subassembly 200 are shuttled away from the label wrapper 400 to fully dispense the printed label 600 and to provide clearance for the wrapper subassembly 410 when wrapping the printed label 600 onto the wire. To do this, the first stepper motor 138 drives the lead screw 130, via the drive pulley 148, the first pulley 142, and the drive belt 144, to pull the lead screw drive nut 136 toward the first pulley 142. This moves the shuttle plate 150, and therefore the lower subassembly 200 and the upper subassembly 300, longitudinally away from the label wrapper 400.

At the same time, the second stepper motor 354 drives the label rewind spool assembly 308 and the second drive roller 320 via the belt 321, to fully dispense the printed label 600 and separate it from the web 602. Preferably, the printed label 600 is dispensed at the same rate, or possibly at a slightly faster rate, than the upper subassembly 300 is shuttled back away from the label wrapper 400. The combination of the slack formed in the printed label 600 as described above and the synchronization of the label feed with the shuttling of the upper subassembly 300 ensure that there are no forces placed on the printed label 600 that would tend to pull the printed label 600 off of the wire.

Once the printed label 600 has been completely removed from the web 602 the second stepper motor 354 reverses direction and drives the first drive roller 316 in reverse via the belt 321, to back the label media 235 to a point where the label media 235 is in a position to print the next label. The backfeeding of the material allows for print on demand capability (i.e., a zero queue of printed labels).

Once the upper subassembly 300 and the lower subassembly 200 have been shuttled away from the label wrapper 400, and the printed label 600 has been fully dispensed, the printed label 600 is wrapped onto the wire by the label wrapper subassembly 410. With the wire and printed label 600 now secure between the V-block assembly 430 and the serrated roller 424, the label wrapper stepper motor 505 spins the wrapper subassembly 410 a partial revolution "backward" around the stationary wire to wrap down the leading edge of the printed label 600 onto the wire. The stepper motor 505 then reverses direction to spin the wrapper subassembly 410 several revolutions "forward" around the stationary wire to completely wrap the printed label 600 onto the wire.

When the printed label 600 has been completely wrapped onto the wire, the printer 50 returns to the print position, as described above and shown in FIG. 39. To do this, the first stepper motor 138 drives the lead screw 130, which moves the lead screw drive nut 136 away from the first pulley 142. This moves the shuttle plate 150, and therefore the upper subassembly 300 and the lower subassembly 200, longitudinally to their original positions. In addition, the pivot motor 512 drives the pivot lead screw 520 to move the pivot lead screw drive nut 524 away from the pivot motor 512, which returns the upper subassembly 300 to its original position. As the upper subassembly 300 returns to its original position, the striker 364 is also lowered, thereby contacting the striker roller 452 and returning the slider 426, and therefore the V-block assembly 430, to its original position, which releases the wire from the V-block assembly 430. Simultaneously, the solenoid 414 allows the inner support wall 402 to pivot back toward the outer support wall 404 and the drive motor 586 driving the jaw mechanism pinion assemblies 583, 587 reverses direction to retract the jaws 550, 552 from the wire releasing the wire for removal from the label applicator 10.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention. For example, the label unwind spool assembly can be fixed to the upper frame, and pivot with the upper frame without departing from the scope of the invention.

We claim:

1. A method for automatically adhering printed labels to an elongated object, comprising the steps of:

a) securing an object in a label wrapper disposed adjacent to a printing mechanism;

b) printing indicia onto a label using said printing mechanism;

c) feeding said label from said printing mechanism into said label wrapper to a point wherein said label engages said object;

d) feeding the label further to form slack in the label to remove tension from the label; and e) wrapping the label onto at least a portion of the object secured in the label wrapper.

2. The method as in claim 1, in which the elongated object is a portion of a wire.

3. The method as in claim 1 which further includes f) shuttling at least one of the printing mechanism and label wrapper to increase the distance between said printing mechanism and label wrapper prior to step e).

4. The method as in claim 3 which includes:

g) feeding said label from said printing mechanism while performing step f).

5. The method as in claim 4, in which said label is fed in step g) at a rate at least equal to the rate of separation between said printing mechanism and label wrapper during the performance of step f).

6. The method as in claim 1, wherein the label wrapper comprises a V-block assembly and a serrated roller and step e) includes:

sandwiching the label and the object between the V-block assembly and the serrated roller.

7. The method as in claim 6, wherein step e) further includes rotating the V-block assembly and the serrated roller around the object to urge the label against the object.

8. The method as in claim 1, in which the object is flexible, and the method includes f) tensioning the object prior to performing step e).

9. The method as in claim 1, in which the object has a non-round cross section.

10. The method as in claim 1, in which the object comprises a bundle of objects.

11. A method for automatically adhering printed labels to a wire, comprising the steps of:

a) securing at least a portion of a wire in a label wrapper disposed adjacent to a printing mechanism;

b) printing indicia onto a label using said printing mechanism;

c) feeding said label from said printing mechanism to engage the wire in said label wrapper;

d) feeding the label from said printing mechanism further to form slack in the label to remove tension from the label;

e) feeding said label from said printing mechanism while shuttling at least one of the printing mechanism and label wrapper to increase the distance therebetween; and f) wrapping the label onto at least a portion of the wire secured in the label wrapper.

12. The method as in claim 11, in which said label is fed in step e) at a rate at least equal to the rate of separation between the printing mechanism and label wrapper.

13. The method as in claim 11, in which the label wrapper comprises a V-block assembly and a serrated roller, and step f) includes sandwiching the label and the object between the V-block assembly and the serrated roller.

14. The method as in claim 13, wherein step f) further includes:

rotating the V-block assembly and the serrated roller around the object to urge the label against the object.

15. The method as in claim 11, in which the object is flexible, and the method includes:

f) tensioning the object prior to performing step e).

16. The method as in claim 11, in which the wire has a non-round cross section.

17. The method as in claim 11, in which the wire comprises a bundle of wires.

18. A method for automatically adhering printed labels to an elongated object, comprising the steps of:

a) securing an object in a label wrapper disposed adjacent to a printing mechanism;

b) printing indicia onto a label carried by a web using said printing mechanism;

c) feeding said label from said printing mechanism into said label wrapper to a point wherein said label partially separates from said web and engages said object;

d) feeding the label further to separate the label from the web and to form a slack to remove tension from the label; and e) wrapping the label onto at least a portion of the object secured in the label wrapper.

* * * * *